(12) United States Patent
Chachad et al.

(10) Patent No.: US 11,720,495 B2
(45) Date of Patent: Aug. 8, 2023

(54) MULTI-LEVEL CACHE SECURITY

(71) Applicant: Texas Instruments Incorporated, Dallas, TX (US)

(72) Inventors: Abhijeet Ashok Chachad, Plano, TX (US); David Matthew Thompson, Dallas, TX (US); Naveen Bhoria, Plano, TX (US)

(73) Assignee: Texas Instmments Incorporated, Dallas, TX (US)

( * ) Notice: Subject to any disclaimer, the term of this patent is extended or adjusted under 35 U.S.C. 154(b) by 288 days.

(21) Appl. No.: 16/882,380

(22) Filed: May 22, 2020

(65) Prior Publication Data

US 2020/0371927 A1  Nov. 26, 2020

Related U.S. Application Data

(60) Provisional application No. 62/852,468, filed on May 24, 2019.

(51) Int. Cl.
| | |
|---|---|
| *G06F 12/0811* | (2016.01) |
| *G06F 9/46* | (2006.01) |
| *G06F 12/0817* | (2016.01) |
| *G06F 12/0831* | (2016.01) |
| *G06F 12/1081* | (2016.01) |
| *G06F 12/14* | (2006.01) |
| *G06F 21/79* | (2013.01) |
| *G06F 12/128* | (2016.01) |
| *G06F 12/0864* | (2016.01) |

(52) U.S. Cl.
CPC .......... *G06F 12/0811* (2013.01); *G06F 9/467* (2013.01); *G06F 12/0828* (2013.01); *G06F 12/0831* (2013.01); *G06F 12/1081* (2013.01); *G06F 12/1441* (2013.01); *G06F 21/79* (2013.01)

(58) Field of Classification Search
CPC ............. G06F 12/0811; G06F 12/0831; G06F 12/1081; G06F 12/1441; G06F 21/79
USPC ........................................................ 711/122
See application file for complete search history.

(56) References Cited

U.S. PATENT DOCUMENTS

| | | |
|---|---|---|
| 2010/0180083 A1 | 7/2010 | Lee et al. |
| 2012/0191916 A1* | 7/2012 | Chachad ............. H03M 13/353 711/E12.024 |
| 2014/0189326 A1 | 7/2014 | Leslie et al. |
| 2015/0089173 A1 | 3/2015 | Chhabra et al. |

(Continued)

OTHER PUBLICATIONS

International Search Report for PCT/US2020/034473 dated Aug. 20, 2020.

*Primary Examiner* — Edward J Dudek, Jr.
*Assistant Examiner* — Sidney Li
(74) *Attorney, Agent, or Firm* — Michael T. Gabrik; Frank D. Cimino

(57) ABSTRACT

In described examples, a coherent memory system includes a central processing unit (CPU) and first and second level caches. The CPU is arranged to execute program instructions to manipulate data in at least a first or second secure context. Each of the first and second caches stores a secure code for indicating the at least first or second secure contexts by which data for a respective cache line is received. The first and second level caches maintain coherency in response to comparing the secure codes of respective lines of cache and executing a cache coherency operation in response.

20 Claims, 14 Drawing Sheets

(56) References Cited

U.S. PATENT DOCUMENTS

2015/0317259 A1 11/2015 Zbiciak et al.
2016/0342530 A1* 11/2016 Pellerin, III ........ G06F 12/0855

* cited by examiner

MULTI-LEVEL CACHE SECURITY

CROSS-REFERENCE TO RELATED APPLICATION

This application claims the benefit of U.S. Provisional Application No. 62/852,468, filed May 24, 2019; which is incorporated herein by reference in its entirety and for all purposes.

BACKGROUND

Processing devices can be formed as part of an integrated circuit, such as a part of a system on a chip (SoC). In some examples, the SoC includes at least one central processing unit (CPU), where each CPU of the SoC is coupled to an integrated (e.g., shared) memory system. The memory system can include, for example, a multi-level cache memory (e.g., static RAM-SRAM-formed on the integrated circuit of the SoC) and at least one main memory (e.g., dynamic RAM-DRAM and/or DDR-memory that can be external to the integrated circuit of the SoC).

Increasingly complex memory architectures continue to provide scalability challenges when adding (or coupling) increasingly powerful CPUs to a processing device. The scalability challenges remain, and can become even greater, when multiple CPUs share a common address space of a memory system. Portions of the common address space of shared memory can include various levels of coherent cache (e.g., where various levels can contain different memories for storing data having a unique address).

In one example, a CPU in a cached memory system can consume an entire cache line every 4 cycles, which places additional processing demands of a cache designed to coherently share stored cache information between various CPUs. Such latencies can be lengthened when a cache is configured to protect certain areas of cache memory from being read or altered by at least one CPU that would otherwise be permitted to access lines of cache. Increasing the data security of such systems can require increased processing power and/or more efficient processing architectures.

SUMMARY

In described examples, a coherent memory system includes a central processing unit (CPU) and first and second level caches. The CPU is arranged to execute program instructions to manipulate data in at least a first or second secure context. Each of the first and second caches stores a secure code for indicating the at least first or second secure contexts by which data for a respective cache line is received. The first and second level caches maintain coherency in response to comparing the secure codes of respective lines of cache and executing a cache coherency operation in response.

DETAILED DESCRIPTION

Figure 1:
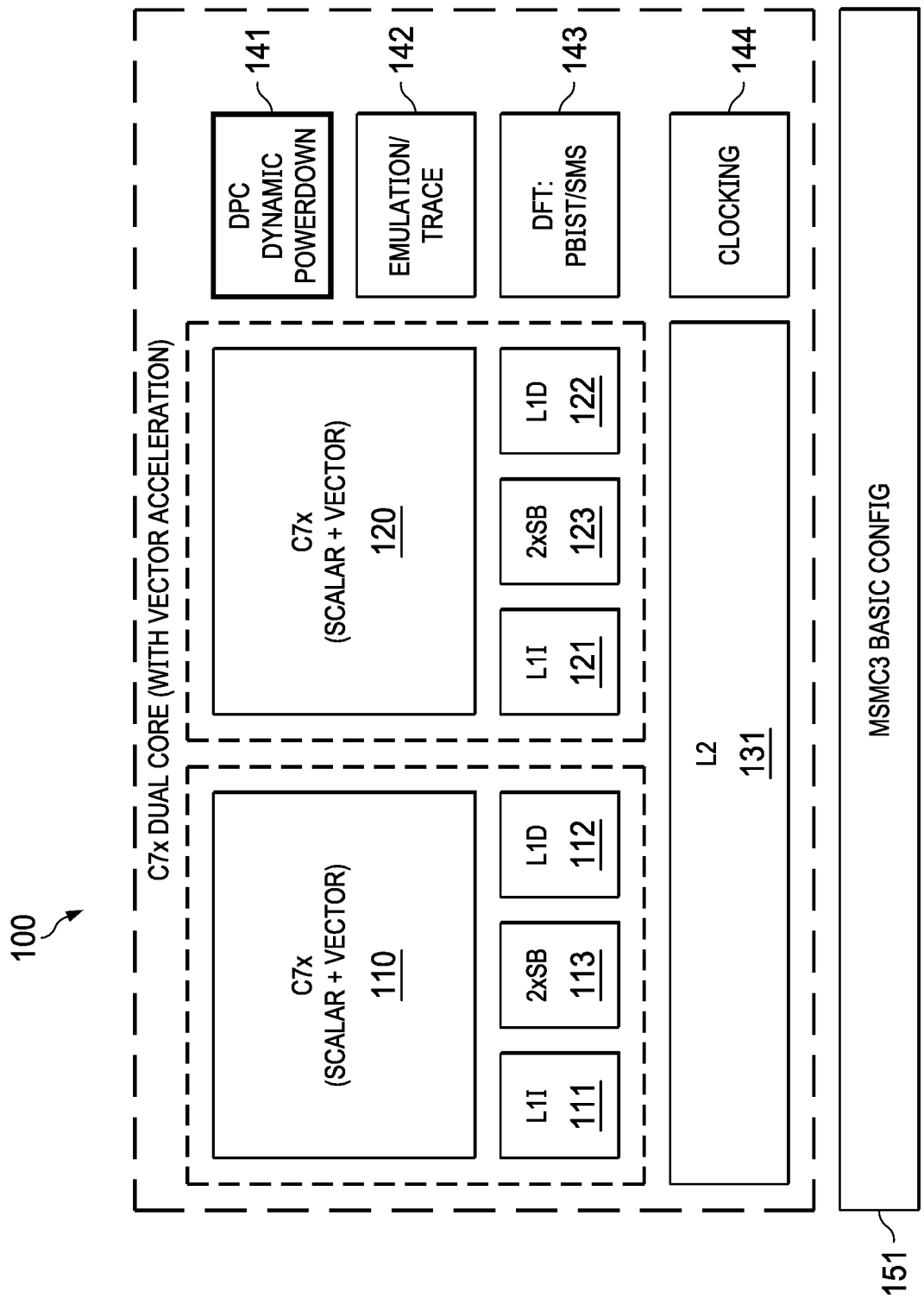
FIG. 1 is a high-level system diagram showing an example dual core scalar/vector processor formed as a system-on-chip.

In the drawings, like reference numerals refer to like elements, and the various features are not necessarily drawn to scale.

A processing device can be formed as part of an integrated circuit, such as a system on a chip (SoC). As described hereinbelow, the processing device can include example security features for protecting security of data in a memory system (such as a multi-level cache system).

FIG. 1 is a high-level system diagram showing an example dual core scalar/vector processor formed as a system-on-chip. SoC 100 is an example dual core scalar and/or vector processor that includes a central processing unit (CPU) 110 core. The CPU 110 core includes a level one instruction cache (L1I) 111, a level one data cache (L1D) 112, and a streaming engine (SE) 113 such as a dual streaming engine (2×SE). The SoC 100 can further include an optional CPU 120 core, which includes a level one instruction cache (L1I) 121, a level one data cache (L1D) 122, and a streaming engine 123. In various example, the CPU 110 core and/or CPU 120 core can include a register file, an arithmetic logic unit, a multiplier, and program flow control units (not specifically shown), which can be arranged for scalar and/or vector processing. The SoC 100 includes a level two unified (e.g., combined instruction/data) cache (L2) 131 that is arranged to selectively cache both instructions and data.

In an example, the CPU 110, level one instruction cache (L1I) 111, level one data cache (L1D) 112, streaming engine 113, and level two unified cache (L2) 131 are formed on a single integrated circuit. In an example, the scalar central processing unit (CPU) 120 core, level one instruction cache (L1I) 121, level one data cache (L1D) 122, streaming engine 123, and level two unified cache (L2) 131 are formed on a single integrated circuit that includes the CPU 110 core.

In an example, the SoC 100 is formed on a single integrated circuit that also includes auxiliary circuits such as dynamic power control (DPC) powerup/powerdown circuit 141, emulation/trace circuits 142, design for test (DFT) programmable built-in self-test (PBIST) and serial message system (SMS) circuits 143, and clocking circuit 144. A memory controller (e.g., a multicore shared memory controller level 3, "MSMC3") 151 is coupled the SoC 100 and can be integrated on the same integrated circuit as the SoC 100. The MSMC3 can include memory access functions such as direct memory access (DMA), so that the MSMC3 can function as (or function in cooperation with) a DMA controller.

CPU 110 operates under program control to execute data processing operations upon data stored in a memory system (e.g., that includes memory shared by multiple cores). The program for controlling CPU 110 includes of a plurality of instructions that are fetched before decoding and execution by the CPU 110.

The SoC 100 includes a number of cache memories. In an example, the level one instruction cache (L1I) 111 stores instructions used by the CPU 110. CPU 110 accesses (including attempting to access) any of the plurality of instructions from the level one instruction cache 111. Level one data cache (L1D) 112 stores data used by CPU 110. CPU 110 accesses (including attempting to access) any addressed data (e.g., any data pointed-to by any of the plurality of instructions) from level one data cache 112. The level one caches (e.g., L1I 111, L1D 112, and 2×SE 113) of each CPU (e.g., 110 and 120) core are backed by a level two unified cache (L2) 131.

In the event of a cache miss of any memory request to a respective level one cache, the requested information (e.g., instruction code, non-stream data, and/or stream data) is sought from the level two unified cache 131. In the event the requested information is stored in level two unified cache 131, the requested information is supplied to the requesting level one cache for relaying the requested information to the CPU 110. The requested information can be simultaneously relayed to both the requesting cache and CPU 110 to reduce access latency to the CPU 110.

The streaming engines 113 and 123 can be similar in structure and operation. In SoC 100, the streaming engine 113 transfers data from level two unified cache 131 (L2) to the CPU 110. Streaming engine 123 transfers data from level two unified cache 131 to the CPU 120. In the example, each streaming engine 113 and 123 controls (and otherwise manages) up to two data streams.

Each streaming engine 113 and 123 is arranged to transfer data of a defined type (e.g., defined structure and/or protocol), where the data is transferred as a stream. A stream includes a sequence of elements of a selected, defined type. Programs that operate on (e.g., consume) streams are instantiated (e.g., configure a processor as a special-purpose machine) to read the included data sequentially and to process each element of the data in turn.

In an example, the stream data includes an indication of defined beginning and ending in time (e.g., where the indication can be used to determine a respective beginning and/or ending point in time). The stream data include elements that generally are of a fixed element size and type throughout the stream. The stream data can include a fixed sequence of elements where programs cannot seek randomly seek elements included within the stream. In an example, stream data is read-only while active, so that programs cannot write to a stream while simultaneously reading from the stream.

When a stream is opened by an example streaming engine, the streaming engine: calculates the address; fetches the defined data type from level two unified cache; performs data type manipulations; and delivers the processed data directly to the requesting programmed execution unit within the CPU. The data type manipulations can include manipulations such as zero extension, sign extension, and data element sorting/swapping (e.g., matrix transposition).

In various examples, the streaming engines are arranged to execute real-time digital filtering operations on defined data types (e.g., well-behaved data). Such engines reduce memory access times (e.g., otherwise encountered by the requesting processor), which frees the requesting processor to execute other processing functions.

In various examples, the streaming engines increase operational efficiency of the level one cache. For example, a streaming engine can minimize the number of cache miss stalls because the stream buffer can bypass the L1D cache (e.g., 111). Also, a streaming engine can reduce the number of scalar operations otherwise required to maintain a control loop and manage the respective address pointers. The stream engines can include hardware memory address generators which reduces the software execution otherwise encountered (e.g., which frees the CPU to perform other tasks) when generating addresses and managing control loop logic.

The level two unified cache 131 is further coupled to higher level memory system components via memory controller 151. The memory controller 151 handles cache misses occurring in the level two unified cache 131 by accessing external memory (not shown in FIG. 1). The memory controller 131 is arranged to control memory-centric functions such as cacheability determination, error detection and correction, and address translation.

The example SoC 100 system includes multiple CPUs 110 and 120. In systems that include multiple CPUs, the memory controller 151 can be arranged to control data transfer between the multiple CPUs and to maintain cache coherence among processors that can mutually access an external memory.

Figure 2:
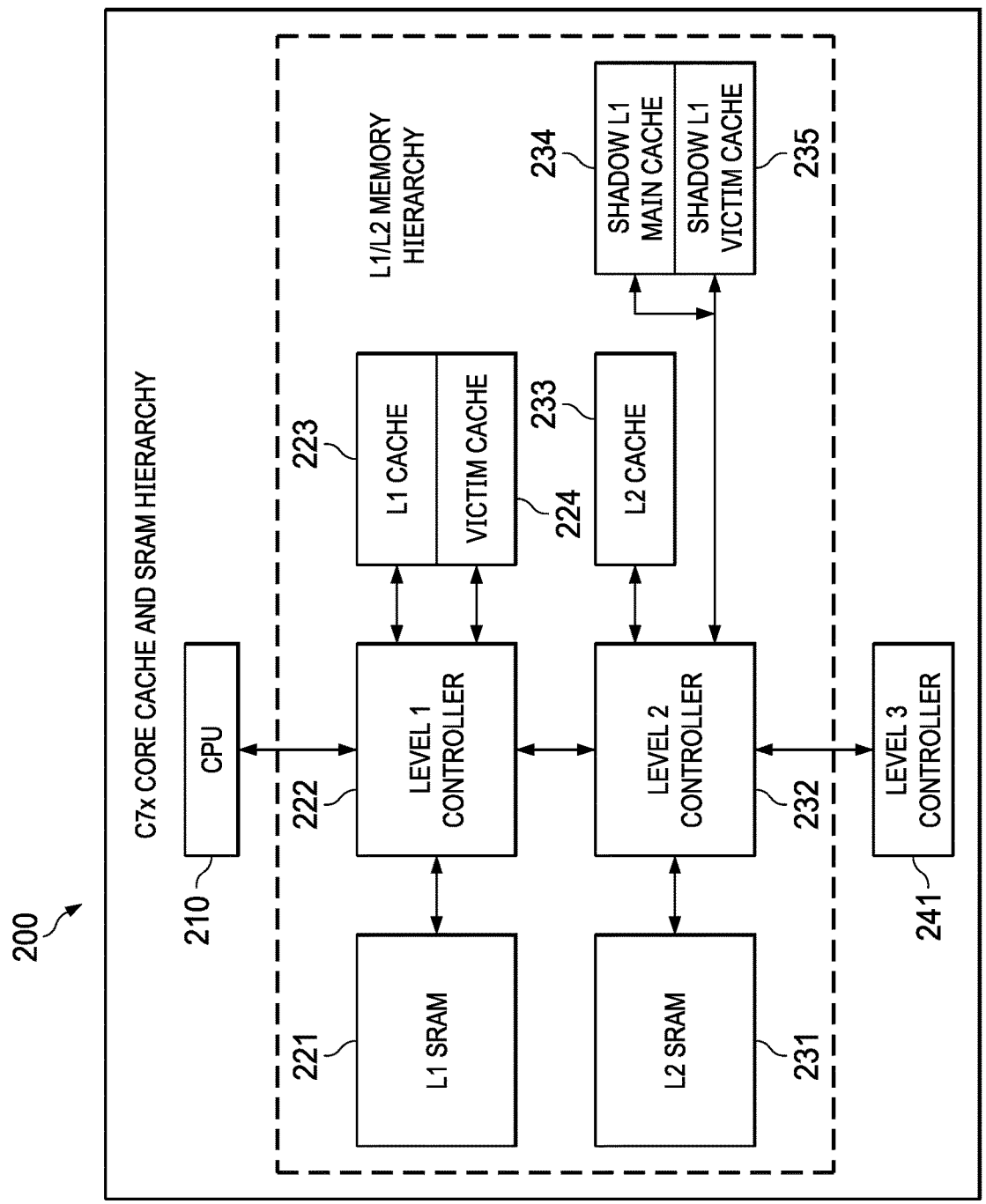
FIG. 2 is a high-level diagram showing levels of an example hierarchical memory system.

FIG. 2 is a high-level diagram showing levels of an example hierarchical memory system. Memory system 200 is an example hierarchical memory system that includes a CPU 210 and controllers (e.g., 222, 232, and 241) for maintaining memory coherence of three respective levels of caching and memory. A first level cache (e.g., L1 data cache) includes L1 SRAM (static ram) 221, level 1 controller 222, L1 cache tags 223, and victim cache tags 224. The first level cache includes memory accessible by the CPU 210 and is arranged to temporarily store data on behalf of the CPU 210, for example. A second level cache (e.g., L2 unified cache) includes L2 SRAM 231, level 2 controller 232, L2 cache tags 233, shadow L1 main cache tags 234, and shadow L1 victim cache tags 234. The second level cache includes memory accessible by the CPU 210 and is arranged to temporarily store data on behalf of the CPU 210, for example. The memory system 200 is coherent throughout and the memory regions of the various levels of cache can include local memory (e.g., including cache lines) that is/are addressable by the CPU. Table 1 shows different memory regions present in the memory system 200, and whether each memory region can be configured as coherent.

TABLE 1

| Region | Description | Coherent/Cacheable status |
|---|---|---|
| L1 SRAM | Attached SRAM for the Level 1 controller | Non-cacheable, inherently coherent because all reads/writes go to the |
| L2 SRAM | Attached SRAM for the Level 2 controller | Cacheable in L1D. Coherent between the following masters: I/O (DMA, non-caching), Streaming Engine (non-caching), MMU (non-caching), L1D (caching). L2 can initiate snoop transactions to L1D as it determines |
| L3 SRAM | Attached SRAM for the Level 3 controller | Cacheable in L1D and L2. Coherent between different modules. L2 enforces coherence snoop transactions initiated by L3. L2 can initiate snoop transactions to L1D as it determines necessary. |
| External memory/DDR | Memory port attached to Level 3 controller | Cacheable in L1D and L2. Coherent between different modules. L2 enforces coherence snoop transactions initiated by L3. L2 can initiate snoop transactions to L1D as it determines necessary. |

The CPU 210 is bidirectionally coupled to the level 1 controller 222, which is bidirectionally coupled in turn to the level 2 controller 232, which in turn is bidirectionally coupled to the level 3 controller 241, so that at least three levels of cache memory are coupled to the CPU 210. Data transfers into and out of L1 SRAM 221 cache memory is controlled by level 1 controller 222. Data transfers into and out of L2 SRAM 231 cache memory is controlled by level 2 controller 232.

The level 1 controller 222 is coupled to (and in some examples includes) the L1 cache tags 332 and the victim cache tags 224. The L1 cache tags 223 are non-data parts of respective L1 cache lines, which have respective data stored in the SRAM 221 cache memory. The L1 victim cache tags (e.g., stored in tag ram) 224 are non-data parts of cache lines, where each cache line includes a respective line of data stored in the SRAM 221 cache memory. In an example, cache lines evicted from the L1 cache are copied into the victim cache, so that, for example, the L1 cache tags 223 are copied into (or otherwise mapped into) the L1 victim cache tags 224. The victim cache can, for example, store the otherwise evicted data at the L1 level, so that a memory request by the CPU 210 that "hits" the line stored in the victim cache can be responded to without having to access the L2 level cache (e.g., so that access times are reduced in such cases).

The level 2 controller 232 is coupled to (e.g., includes) two sets of cache tags. A first set of cache tags includes L2 cache tags 233, where are non-data parts of respective L2 cache lines, and where each cache line includes a respective line of data stored in the SRAM 231 cache memory. The second set of cache tags includes the shadow L1 main cache tags 234 and the shadow L 1 victim cache tags 235. The shadow L1 main cache tags 234 generally correspond to (e.g., point to or include the same information as) the L1 cache tags 223. The shadow L1 victim cache tags 235 generally correspond to (e.g., point to or include the same information as) the L1 victim cache tags 224. The shadow L1 main cache tags 234 include at least the valid and dirty status of the corresponding cache lines in L1 cache tags 223, while the shadow L1 victim cache tags 235 include at least the valid and dirty status of the corresponding cache lines in L1 victim cache tags 224.

The level 2 controller 232 generates snoop transactions to maintain (e.g., including updating and achieving) read and write coherence of the second level cache with the state of the first level cache. For example, the level 2 controller 232 sends snoop transactions to the level 1 controller to determine the status of L1D cache lines and updates the shadow tags (e.g., 234 or 235) that pertain to the L1D cache lines being queried. The shadow tags (e.g., 234 or 235) can be used only for snooping transactions that are used to maintain L2 SRAM coherency with the level one data cache. In an example, updates for all cache lines in higher level caches can be ignored, which increases the efficiency of the L1-to-L2 cache interface.

In response to the snoop request data returned by the level 1 controller 222, the level 2 controller 232 updates the shadow tags (e.g., 234 or 235) that correspond to the L1 cache lines being snooped. Events for which updates are executed include events such as allocation of L1D cache lines and such as dirty and invalidate modifications to data stored in L1 SRAM 221.

Hardware cache coherence is a technique that allows data and program caches in different groups called "shareability domains" (e.g., shared across different CPUs, or even within a single CPU), as well as different requestors (including those that might not include caches) to have permission to access (e.g., read) the most current data value for a given address in memory. Ideally, this "coherent" data value is required to be accurately reflected to every observer in the shareability domain. An observer can be a device such as a cache or requestor that issues commands to read a given memory location.

Through the use of memory attributes, certain memory locations may be marked as "shareable", and others may be marked as "non-shareable." To maintain complete coherency in an ideal system, only the shareable memory regions (e.g., where a region can be one or more contiguous locations) need be kept coherent between the caches/requestors (observers) that are part of a same shareability domain. Coherency for non-shareable memory locations need not be maintained. Described hereinbelow are methods and apparatus arranged to efficiently achieve coherency for the shareable memory regions. When a shareable memory region is coherent, it is shareable, for example, because all of the data locations of the shareable memory region have the most current value of the data assigned to each location of the shareable memory region.

Described hereinbelow are techniques, control logic, and state information of an example functionally correct coherent system. Each observer can issue read (and optionally write) requests to locations that are marked shareable. Moreover, caches can also have snoop requests issued to them, requiring their cache state to be read, returned, or even updated, in response to a type of the snoop operation.

In a multi-level cache hierarchy, the middle levels of the cache hierarchy (e.g. L2) are able to both send and receive snoop operations (e.g., to maintain coherency between the different levels of the cache). In contrast, the first level of a cache hierarchy (e.g. level 1 controller 222) receives snoop operations but does not dispatch snoop operations. Moreover, the last level of the cache hierarchy (e.g. the level 3 controller 241) may dispatch snoop operations but does not receive snoop operations. Generally, snoop operations are intrinsically dispatched in a higher cache levels to lower cache levels withing a cache hierarchy (e.g., where lower represents cache structures closer to the CPU processing element and higher represents cache structures farther away from the CPU processing element).

The level 2 controller 232 includes hardware, control logic, and state information for accurately querying, determining, and processing the current state of coherent (shareable) cache lines in the level 1 cache (e.g., L1D 112), where the lower-level cache is arranged as a heterogeneous cache system. In an example, the level 1 controller 222 manages a heterogeneous cache system that includes a main cache (e.g., set associative) and a victim cache (e.g., fully associative).

The coherence of the memory system 200 can be enforced by recording the status of each cache line of the caches of each cache line using a MESI (modified-exclusive-shared-invalid) Coherence scheme (including derivatives thereof). The standard MESI cache coherence protocol includes the four states: modified, exclusive, shared, invalid (or derivatives thereof) for each cache line.

The Modified state indicates that values in the respective cache line are modified with respect to main memory, and that the values in the cache line are held exclusively in the current cache. The Modified state indicates that the values in the line are explicitly not present or not valid in any other caches in the same shareability domain.

The Exclusive state indicates that the values in the respective cache line are not modified with respect to main memory, but that the values in the cache line are held exclusively in the current cache. This indicates that the values in the line is explicitly not present or not valid in any other caches in the same shareability domain.

The Shared state indicates that the values in the respective cache line are not modified with respect to main memory. The values in the cache line can be present in multiple caches in the same shareability domain.

The Invalid state indicates that any values in the respective cache line are to be treated as if they are not present in the cache (e.g., as a result of being invalidated or evicted).

A shareability domain can be defined as a collection of caches that must remain coherent with one another. Not all MESI states are necessarily required to implement a coherent system with multiple levels of cache hierarchy. For example, the shared state can be eliminated (e.g., at the cost of performance), which results in a MEI coherence system. In an MEI coherent system, exactly one cache in the entire system can hold a copy of each MEI cache line at a given time, regardless of whether the cache line is modified (or could be modified in the future).

The unit of coherence in a coherent cache system is a single cache line, so that length of data (e.g., the number of addresses for accessing the data within a cache line, whether 32, 64, or 128 bytes) is treated as an atomic unit of coherence. In the example system 300 (described hereinbelow with respect to FIG. 3), the caching mechanism shared between L1D and L2 includes a unit of coherence of 128 bytes. Generally, the structures and tracking mechanisms of the first and second levels of cache operate on the selected unit of coherence in an atomic manner.

Various coherency transactions can be initiated for the purpose of maintaining cache coherency. Such coherency transactions include transaction types such as Read, Write, Snoop, Victim. Each transaction type can have multiple forms/variants, which are included by the bus signaling protocol (such as the VBUSM.C protocol specification).

A Read coherency transaction includes returning the "current" (e.g., most recent) value for the given address, whether that value is stored at the endpoint (e.g., in external memory), or in a cache in the coherent system.

A Write coherency transaction includes updating the current value for the given address, and invalidating copies stored in caches in the coherent system.

A Cache maintenance operation (CMO) includes operations that initiate an action to be taken in the coherent caches (L1D and L2) for a single address.

A Snoop coherency transaction ("Snoop") includes reading, invalidating, or both reading and invalidating copies of data stored in caches. Snoops are initiated by a higher level controller of the hierarchy to a cache at the next lower level of the hierarchy. The snoops can be further propagated by the controller of a lower level cache to even lower levels of the hierarchy as needed to maintain coherency.

A Victim coherency transaction includes sending a victim cache line ("Victim") from a lower level cache in the hierarchy to the next higher level of the cache hierarchy. Victims are used to transfer modified data up to the next level of the hierarchy. In some situations, victims can be further propagated up to higher levels of the cache hierarchy. In an example situation where the L1D sends a victim to L2 for an address in the DDR or L3 SRAM, and the line is not present in the L2 cache, the L2 controller is arranged to forward the victim to the next level of the cache hierarchy.

Table 2 describes example coherent commands that can be initiated between L2 and the various masters that interact with the L2 cache.

TABLE 2

| Master | Master-initiated | L2-initiated |
| --- | --- | --- |
| PMC | Read | none |
| MMU | Read | none |
| Streaming Engine (SE) | Read, CMO | none |
| DMC | Read, Write, Victim | Snoop |
| MSMC (L3 controller) | Snoop, DMA Read, DMA Write | Read, Write, Victim |

The level 2 controller 232 maintains local information (e.g., in the level 2 shadow tags) that is updated to reflect each change of the monitored state information that occurs within the hardware FIFOs, RAMs, and logic within the first level cache, so that the current (e.g., most recent) state of all coherent cache lines present in both the main cache and victim cache in the L1 controller can be determined locally at the level 2 cache. Pipelined hardware on a dedicated bus between the level 1 cache and the level 2 cache can increase the speed of keeping the level 2 shadow registers updated and reduce the demand for the bidirectional data access bus that is used to read and write data between the level 1 cache and the level 2 cache. Accurately updating the shadowed information maintains the correct data values and functionality of a coherent hardware cache system.

Figure 3:
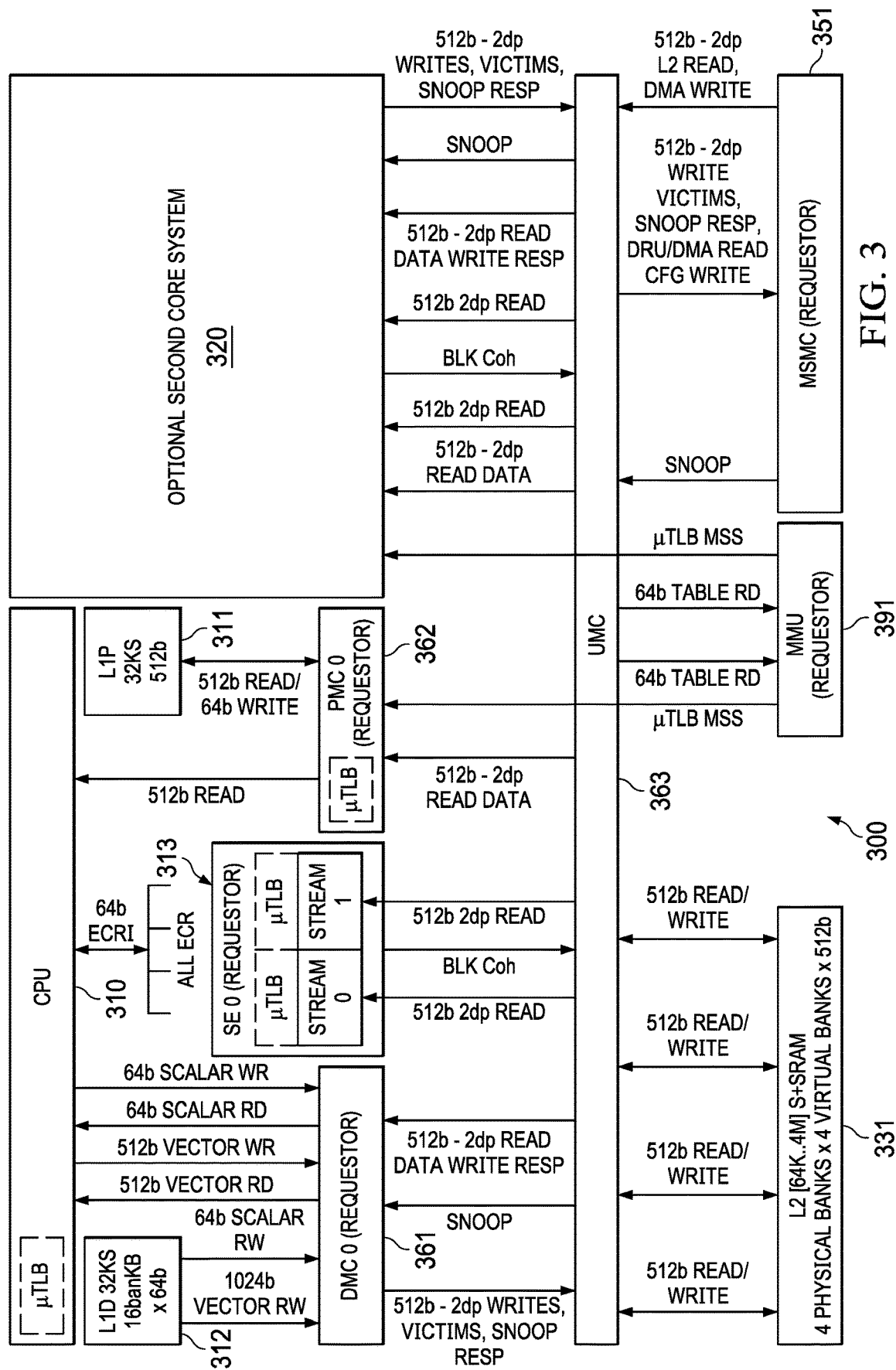
FIG. 3 shows an example one- or optionally two-core scalar and/or vector processor system 300 having a coherent and hierarchical memory architecture.

FIG. 3 shows an example one- or optionally two-core scalar and/or vector processor system 300 having a coherent and hierarchical memory architecture. System 300 is an example coherent shared memory system, such as system 200 or SoC 100. The system 300 includes at least one CPU core. For example, a first core can include first CPU 310, DMC 361, 32 KB L1D cache 312, PMC 362, 32 KB L1I cache 311, and dual stream buffer 313. An optional second core can include components similar to the first core. The CPU 310 (and second core 320, if present) are coupled via respective interfaces to the UMC 363, which is arranged to control the L2 cache tags and memory.

Generally described, system 300 includes various cache controllers such as program memory controller (PMC) 362 (e.g., for controlling data transfer to and from level 1 program 311 cache) and data memory controller (DMC) 361

(e.g., for controlling data transfer into and out of level 1 data cache 312). As shown in FIG. 1, the L2 cache can be shared between the two processing cores. System 300 also includes unified memory controller (UMC) 363 (e.g., for controlling data transfers between level 2 and level 3 caches). The UMC 363 is included by the level 2 cache, which is described hereinbelow with respect to FIG. 4, for example. The UMC 363 is coupled to the MMU (memory management unit) 391 and the MSMC 351. The DMC 361, the PMC 362, the SE 313, MSMC 351, and the MMU 391 are requestors, all of which can access memory stored in the L2 cache.

In an example, the system 300 is a pipelined caches and memory controller system for fixed- and/or floating-point DSPs (digital signal processors). The system 300 includes at least one such CPU core (where each CPU core includes respective private L1 caches, controllers, and stream buffers), and a shared L2 cache controller. The system 300 can provide bandwidth of up to 2048-bits of data per cycle, which is an 8-times bandwidth improvement over a previous-generation system. The L1D can sustain transferring 512-bits of data to the CPU every cycle, and the L2 cache can transfer 1024-bits of data to the dual stream buffer every cycle. The L1 and L2 controllers have the ability to queue up multiple transactions out to a next higher level of memory, and can reorder out-or-order data returns. The L1P 311 controller supports branch exit prediction from the CPU and can queue up multiple prefetch misses to the L2 cache included by UMC 363.

The system 300 includes full soft error correction code (ECC) on its data and TAG rams (e.g., described hereinbelow with respect to FIG. 4). The employed ECC scheme provides error correction for data transmitted over processor pipelines and interface registers, in addition to the error correction for memory-stored data. The system 300 supports full memory coherency in which, for example, the internal (e.g., included by the level 1 and level 2 caches) caches and memories are kept coherent with respect to each other and with respect to external caches and memories (such as the MSMC 351 for level 3 caching and such as external memory at a fourth and final level memory hierarchy). The UMC 363 maintains coherency between the multiple L1Ds and maintains coherency between the L1Ds and each of the higher, successive levels of the cache and memory. The UMC 363 can maintain coherency with the dual streaming engine by snooping (e.g., via a pipeline separate from a stream datapath) L1D cache lines in response to streaming engine reads.

The system 300 supports coherency throughout virtual memory schemes, and includes address translation, μTLBs (micro translation look-aside buffers), L2 page table walks, and L1P cache invalidates. The UMC 363 can support one or two stream buffers, each with two streams. The stream buffer data are kept coherent to the L1D cache, where each stream buffer has a pipelined, high bandwidth interface to L2 cache.

The system 300 includes example interfaces between various components of differing hierarchies in the system 300. With the possible exceptions of the CPU-to-DMC (CPR-DMC) and the CPU-to-PMC (CPR-PMC) interfaces, the inter-level interfaces and data paths can be architected in accordance with a pipelined, multiple transactions standard (e.g., VBUSM or MBA).

The example interfaces include the CPU-DMC, CPU-PMC, DMC-UMC, PMC-UMC, SE-UMC, UMC-MSMC, MMU-UMC, and PMC-MMU interfaces. The CPU-DMC includes a 512-bit vector read and a 512-bit vector write and a 64-bit scalar write. The CPU-PMC includes a 512-bit read. The DMC-UMC includes a 512-bit read and 512-bit write interfaces for executing cache transactions, snoop transactions, L1DSRAM DMA, and external MMR accesses (e.g., where each such interface can handle 2 data phase transactions). The PMC-UMC interface includes a 512-bit read (which supports 1 or 2 data phase reads). The SE-UMC interface includes 512-bit read (which supports 1 or 2 data phase reads). The UMC-MSMC UMC interface includes 512-bit read and 512-bit write (with overlapping Snoop and DMA transactions). MMU-UMC interface includes page table walks from L2. The PMC-MMU interface includes μTLB miss to MMU.

The L1P 311 includes a 32 KB L1P cache that is 4-way set associative having a 64-byte cache line size, where each line is virtually indexed and tagged (48-bit virtual address). The L1P 311 includes auto prefetching on L1P misses (where a prefetch miss from L2 can include a two data phase data return. The L1P 311 is coupled to (e.g., included by) and controlled by the PMC 362.

The PMC 362 supports prefetch and branch prediction with the capability to queue up to a variable number (e.g., up to 8) fetch packet requests to UMC (e.g., to enable deeper prefetch in program pipeline).

The PMC 362 includes error correction codes (ECC) with parity protection on data and tag RAMs (e.g., 1-bit error detection for tag and data RAMs). The Data RAM parity protection is supplied with 1 parity bit per every 32 bits). In tag RAMs, a parity error can force auto-invalidate and pre-fetch operations.

The PMC 362 supports global cache coherence operations. The PMC 362 can single-cycle cache invalidate with support for three modes (e.g., All Cache Lines, MMU Page Table Base 0, and MMU Page Table Base 1).

The PMC 362 provides virtual memory by virtual-to-physical addressing on misses and incorporates a μTLB to handle address translation and for code protection.

The PMC 362 provides emulation and debugging capability by including access codes that can be returned on reads to indicate the level of cache that the data was read from and bus error codes that can be returned to indicate pass/fail status of all emulation reads and writes. The PMC 362 provides extended control register access including L1P ECR registers accessible from the CPU through a non-pipelined interface. The extended control registers are not memory mapped, and instead can be mapped via a MOVC CPU instruction.

L1D Cache 312 is a direct mapped cache, and is mirrored in parallel with a 16 entry fully associative victim cache. The L1D Cache 312 includes a 32 KB memory configurable down to 8 KB cache. The L1D Cache 312 includes a dual datapath (e.g., for 64-bit scalar or 1-Kb vector operands). The L1D Cache 312 includes a 128-byte cache line size. The LID Cache 312 includes read allocate cache support for both write-back and write-through modes. The LID Cache 312 is physically indexed, physically tagged (44-bit physical address), supports speculative loads and hit under miss, has posted write miss support, and provides write merging on all outstanding write transactions inside LID. The LID Cache 312 supports a FENCE operation on outstanding transactions. The LID is auto-flushing and idle-flushing.

The LID Cache 312 includes LID SRAM for supporting accesses from CPU and DMA. The amount of available SRAM is determined by the total of L1D memory and L1D cache size.

The DMC 361 includes lookup table and histogram capability to support 16 parallel table lookup and histograms. The DMC 361 can initial the lookup table and dynamically configure the L1D SRAM into multiple regions/ways in response to a selected degree of parallelism.

The DMC 361 includes 64-bit and 512-bit CPU load/store bandwidth, 1024 bit LID Memory bandwidth. The DMC 361 provides support for 16 interfaces for 64-bit wide banks with up to 8 outstanding load misses to L2. Physical banks and virtual banks are described hereinbelow with respect to FIG. 5A and FIG. 5B.

The DMC 361 includes Error Detection and Correction (ECC). The DMC 361 includes ECC Detection and Correction on a 32-bit granularity. This includes full ECC on data and tag RAMs with 1-bit error correction and 2-bit error detection for both. The DMC 361 provides ECC syndromes on writes and victims out to L2. The DMC 361 receives ECC syndromes with read data from L2, and performs detection and correction before presenting the validated data to CPU. The DMC 361 provides full ECC on victim cache lines. The DMC 361 provides provide read-modify-write support to prevent parity corruption on partial line writes. The ECC L2-L1D interface delays correction for read-response data pipeline ECC protection.

The DMC 361 provides emulation and debug execution by returning access codes (e.g., DAS) on reads to indicate the level of cache that the data was read from. Bus error codes can be returned to indicate pass/fail status of emulation reads and writes. The contents of the cache tag RAMs are accessible via the ECR (extended control register).

The DMC 361 provides atomic operations on the Swap operation or the Compare and Swap operations to cacheable memory space and increment to cacheable memory space.

The DMC 361 provides coherence including fully MESI (modified-exclusive-shared-invalid) support in both main and victim caches. The DMC 361 provides support for global cache coherence operations including snoops and cache maintenance operation support from L2, snoops for L2 SRAM, MSMC SRAM and external (DDR) addresses and full tag-RAM comparisons on snoop and cache maintenance operations.

In an example, the DMC 361 provides 48-bit wide virtual memory addressing for physical addressing of memory having physical addresses of 44-bits.

The DMC 361 supports Extended Control Register Access. L1D ECR registers are accessible from the CPU through a non-pipelined interface. These registers are not memory mapped, and instead are mapped to a MOVC CPU instruction.

The DMC supports L2 address aliasing (including VCOP address aliasing mode). The aliasing can be extended to multiple, separate buffers, such as the VCOP-IBUFAH, IBUFAL, IBUFBH, IBUFBL buffers. The L2 address aliasing includes out-of-range and ownership checking for all buffers to maintain privacy.

UMC 363 controls data flow into and out of L2 cache 331. L2 cache 331 is 8-Way Set associative, supports cache sizes 64 KB to 1 MB. L2 cache 331 policy includes random least recently used (LRU) and/or random replacement. L2 cache 331 has a 128-byte cache line size. L2 cache 331 has a write-allocate policy and supports write-back and write-through modes. L2 cache 331 performs a cache invalidation on cache mode changes, which is configurable and can be disabled. L2 cache 331 is physically indexed, physically tagged (44-bit physical address) including 4 each of banked tag RAM's, which allow four independent split pipelines. L2 cache 331 supports 2 each of 64-byte streams from a streaming engine, the LID and LIP caches, and configuration and MDMA accesses on an unified interface to MSMC 351. L2 cache 331 caches MMU page tables.

An example L2 SRAM component of L2 cache 331 includes 4 each of 512-bit physical banks, with each physical bank having 4 virtual banks. Each bank (e.g., physical and/or virtual bank) has independent access control. L2 SRAM includes a security firewall on L2 SRAM accesses. L2 SRAM supports DMA accesses on a merged MSMC interface.

UMC 363 provides prefetch hardware and on-demand prefetch to External (DDR), MSMC SRAM and L2 SRAM.

The L2 cache provides error detection and correction (e.g., ECC) on a 256-bit granularity. Full ECC support is provided for both tag and data RAMS with 1-bit error correction and 2-bit error detection for both. The ECC (see, for example ECC GEN RMW 471, described hereinbelow) includes ECC syndrome on writes and victims out to MSMC 351 and includes Read-Modify-Writes on DMA/DRU writes to keep parity valid and updated. The ECC is arranged to correct and/or generate of multiple parity bits for data being sent over datapaths/pipelines to the LIP 311 and SE 313. This includes an auto-scrub to prevent accumulation of 1-bit errors, and to refresh parity. The ECC clears and resets parity on system reset.

UMC 363 provide emulation and debugging by returning access codes on reads to indicate the level of cache that the data was read from. Bus error codes are returned to indicate pass/fail status of emulation reads and writes.

UMC 363 supports full coherence between the L1D 312, 2 Streams of the SE 313, L2 SRAM 331, MSMC 351 SRAM and external memory (DDR). This includes L1D to shared L2 coherence, which can be maintained in response to snoops for L2 SRAM, MSMC SRAM and External (DDR) addresses. The coherence is maintained via a MESI scheme and policies. UMC 363 includes user coherence commands from the SE 313 and includes support for Global Coherence operations.

UMC 363 supports Extended Control Register Accessing. L1D ECR registers are accessible from the CPU through a non-pipelined interface. The content of the ECR registers are accessible in response to a MOVC CPU instruction.

The UMC 363 supports L2 address aliasing (including VCOP Address Aliasing mode). The aliasing can be extended to multiple, separate buffers, such as the VCOP-IBUFAH, IBUFAL, IBUFBH, IBUFBL buffers. The L2 address aliasing includes out-of-range and ownership checking for all buffers to maintain privacy.

The MSMC 351 allows the processor modules 110 to dynamically share the internal and external memories for both program and data within a coherent memory hierarchy. The MSMC 351 includes internal RAM, which offers flexibility to programmers by allowing portions of the internal RAM to be configured as shared level 3 RAM (SL3). The shared level 3 RAM is cacheable in the local L2 caches. The MSMC can be coupled to on-chip shared memory.

An MFENCE (memory fence) instruction is provided that stalls the instruction execution pipeline of the CPU 310 until the completion of all the processor-triggered memory transactions, which can include: cache line fills; writes from L1D to L2 or from the processor module to MSMC 351 and/or other system endpoints; victim write backs; block or global coherence operations; cache mode changes; and outstanding XMC Prefetch Requests. The MFENCE instruction is useful as a simple mechanism for stalling programs until dispatched memory requests reach their endpoint. It also can provide ordering guarantees for writes arriving at a single endpoint via multiple paths, for example, where multiprocessor algorithms depend on ordering of data written to a specific address, and during manual coherence operations.

The system memory management unit (MMU) 391 invalidates µTLBs in response to processor context switches, for example to maintain privacy.

Figure 4:
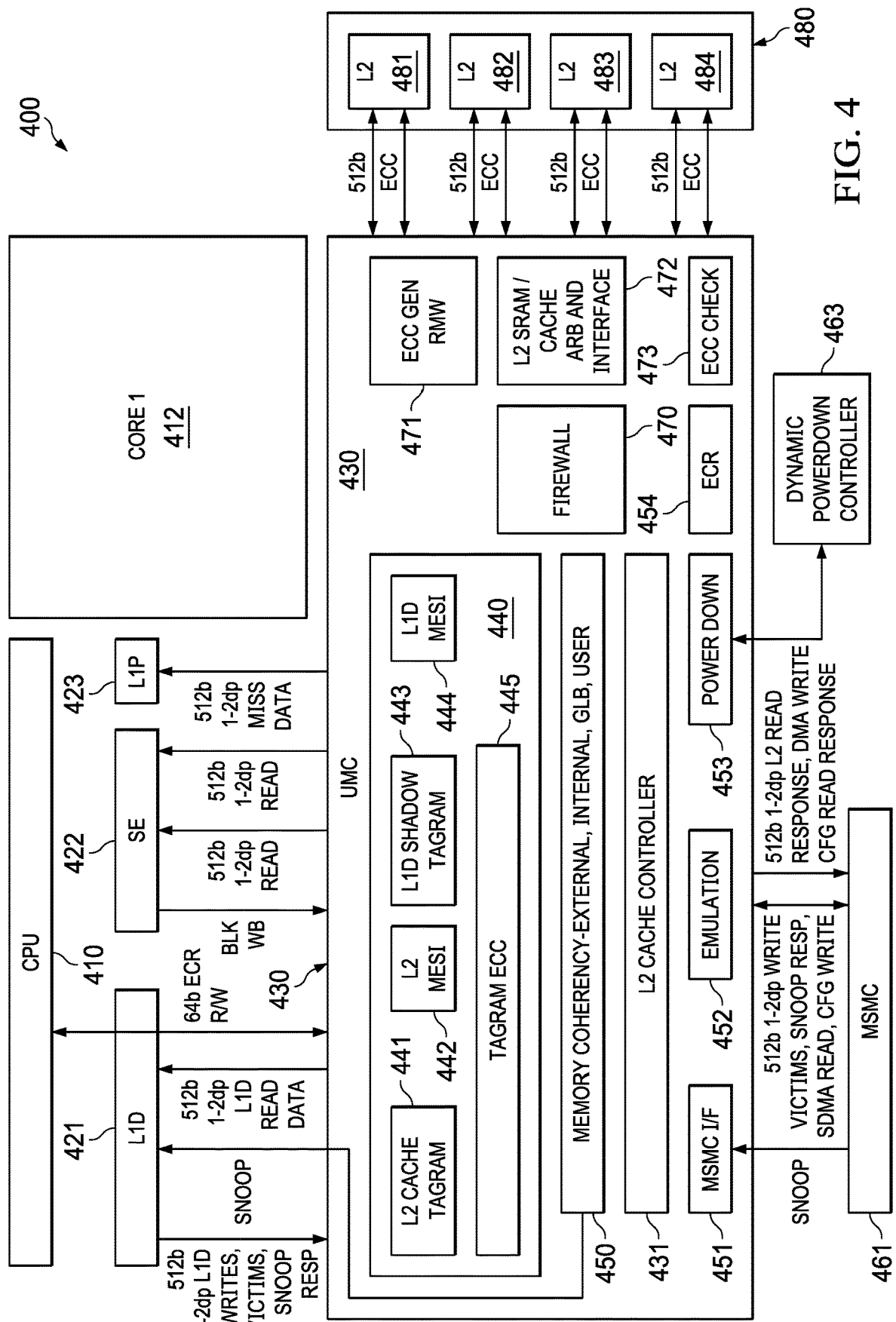
FIG. 4 shows an example unified memory controller of a second level of a coherent and hierarchical memory architecture.

FIG. 4 shows an example unified memory controller of a second level of a coherent and hierarchical memory architecture. System 400 is an example coherent shared memory system, such as system 300. The system 400 includes at least one CPU. For example, a first core (core 0) can include CPU 410, L1D 421, SE 422, L1P 423, and a MSMC 461, a dynamic powerdown controller 463, and a level 2 memory 480. An optional second core (core 1) can include components similar to the first core. The first core (and second core 412, if present) are coupled via respective interfaces to the UMC 430, which is arranged to control the L2 cache tags and memory.

The UMC 430 can include an L2 cache controller, a status memory 440 (which includes L2 cache tag RAM 441, L2 MESI 442, L1D shadow tag RAM 443, L1D MESI 444, and tag RAM ECC 445), memory coherency (external, internal, global, user) 450 controller, MSMC interface 451, emulation 452 controller, power down controller 453, extended control register (ECR) 454, firewall 470, ECC generator read-modify-write (ECC GEN RMW), L2 SRAM/cache arbitration and interface 472, and ECC checking 473.

Generally described (with reference to FIG. 3 and FIG. 4), system 400 can include six requestor ports (e.g., interfaces) coupled to the UMC 430: one PMC 362, one DMC 361, two SE ports (included in one streaming engine, SE 313), internal ECR 454 interface from the CPU (e.g., CPU 410), and the MSMC 461. The DMC 361 interface has separate 512-bit read and write paths. This interface can also be used for snooping from the L1D cache. Each read transaction can be either one or two data phases. The PMC 362 interface consists of a 512-bits read-only path (L1P fetch only). Each read transaction can be either one or two data phases. Two SE interfaces (of SE 313) are 512-bit read-only. Each read transaction can be either one or two data phases. The read transactions are also used as part of the user block coherence functionality. The MSMC 461 interface consists of separate 512-bit read and write paths. The separate 512-bit read and write paths interfaces are also used for snoop commands, read/write accesses to L2 SRAM, and read/write accessed to L1D SRAM. Each read transaction can be either one or two data phases. The internal ECR 454 interface from each CPU of system 400 is a 64-bit non-pipelined interface, and is used for configuration accesses to ECR 454 registers of the UMC 430.

The UMC to DMC interface can include: a 512-bit DMC read path; a 512-bit DMC write path; DMC to UMC signals (such as Read/Write/Victim Address, Address and Secure of cache line evicted to victim buffer, Address and Secure of cache line evicted from victim buffer, two tag update interfaces to indicate a clean line which was evicted from the victim buffer, byte enables, read/write indicator, MMU Page table attributes/privilege/security level indicators, Snoop response, L1D cache-mode signals such as size, size change on, global coherence on, and global coherence type); and UMC to DMC signals (such as snoop signaling, response on reads and writes, and other such handshaking signals).

The UMC to PMC interface can include: a 512-bit PMC read path; a PMC to UMC fetch address; and other such handshaking signals.

The UMC to SE interface can include: a 512-bit SE read path; a SE to UMC fetch address; SE to UMC User Block Coherence indicators; and other such handshaking signals.

The MSMC to UMC interface can be coupled to carry multiple types of transactions such as: Master DMA (MDMA, which can include cache allocates, victims, long distance writes, and non-cacheable reads, where such MDMA transactions can originate from the UMC); External Configuration (ECFG, which can include read/write accesses to memory mapped registers that can be physically located outside the CPU core, where such read/write access can originate from the UMC); DMA transactions (which can originate from the MSMC and are transactions that can transfer data, for example, between different CPU cores, between a CPU core and an external DDR), or between a CPU core and a non-DDR memory on the SOC, where the transaction can be created by the DMA controller, and can be directed towards either L2 SRAM or L1D SRAM); snoop transactions (which can originate from the MSMC, and can be generated in response to a transaction from another core, so that the another core can snoop data from a first CPU core); and cache warm (e.g., so that the MSMC can originate transactions that UMC can use to allocate a line from a 3 L cache or an external memory to the UMC cache).

The UMC to MSMC interface can include: a 512-bit MSMC read path; a 512-bit MSMC write path; MSMC to UMC signals (such as Address, Byte enables, Read/write indicator, MMU Page table attributes/Privilege/security level indicators, Snoop transactions, DMA transactions, and Cache Warm transactions); and UMC to MSMC signals (such as snoop response, address, byte enables, read/write indicator, and MMU page table attributes/privilege/security level indicators) and other such handshaking signals.

The system 400 can include Extended Control Registers (ECR) that are mapped to the MOVC CPU instruction. The UMC ECR path allows for 64-bit read/write access to the UMC's control registers. For configuration reads, the UMC is arranged to sample the contents of the register and hold it for the duration of the access. The UMC ECR interface includes: a 64-bit ECR read path; a 64-bit ECR write path; Address; Privilege/security level indicators; index, which can be used for cache tag viewing; and other such handshaking signals.

The UMC to MMU Interface can include: a 64-bit read path; an address; and other such handshaking signals.

UMC to L2 Interface can include: virtual banks; physical banks of L2 memory, where each bank includes an address-able unit of data that is 512-bits wide; a 512-bit read datapath; a 512-bit write datapath; address; byte-enables; memory enable indicator; read/write indicators; virtual bank select; and other such handshaking signals.

The UMC 430 can include a level 2 memory 480 (e.g., SRAM). The L2 memory 480 can include any suitable number of banks, and 4 banks 481, 482, 483, and 484 are illustrated, where each such bank is coupled by respective sets of a 512b read/write data path and an ECC data path. The 4 banks can be organized as having 4 virtual banks each, or as having 2 virtual banks each, as respectively described hereinbelow with references to FIG. 5A and FIG. 5B

Figure 5A:
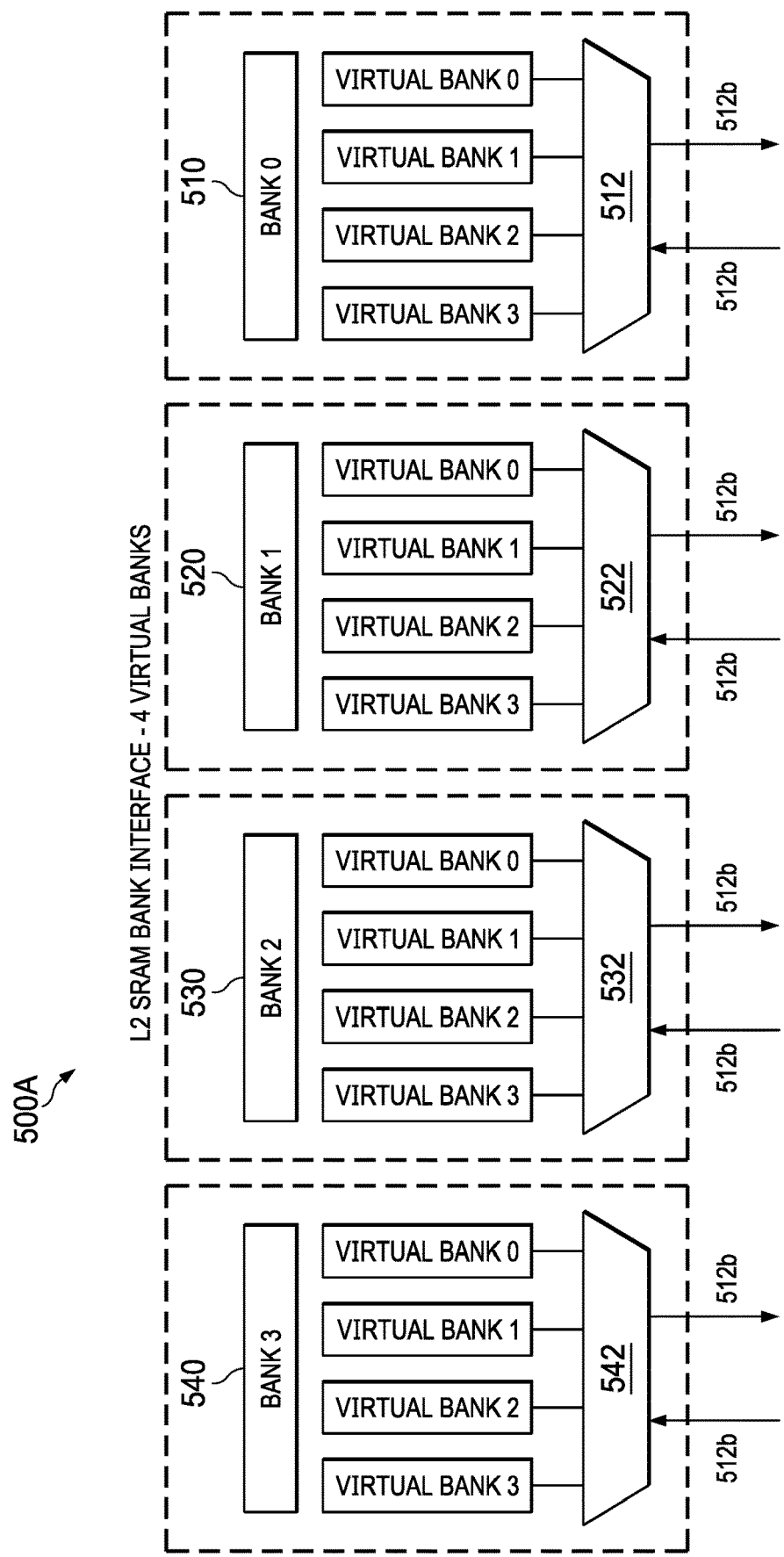
FIG. 5A shows an example level 2 memory bank interface of the system of FIG. 4 having 4 virtual banks per physical bank.

FIG. 5A shows an example level 2 memory bank interface of the system of FIG. 4 having 4 virtual banks per physical bank. For example, the interface 500A includes physical bank 510 (e.g., bank 0), physical bank 520 (e.g., bank 1), physical bank 530 (e.g., bank 2), and physical bank 540 (e.g., bank4). Each of the physical banks 510, 520, 530, and 540 respectively includes 4 virtual banks (virtual bank 0, virtual bank1, virtual bank 2, and virtual bank 3). Each of the virtual banks of each physical bank includes a respective multiplexor/demultiplexor, so that each respective virtual bank of a given (e.g., addressed) physical bank can be written to or read from in a virtual bank memory access.

Each virtual bank in a given physical bank can be successively accessed using (e.g., overlapping or separate) virtual bank memory accesses.

Figure 5B:
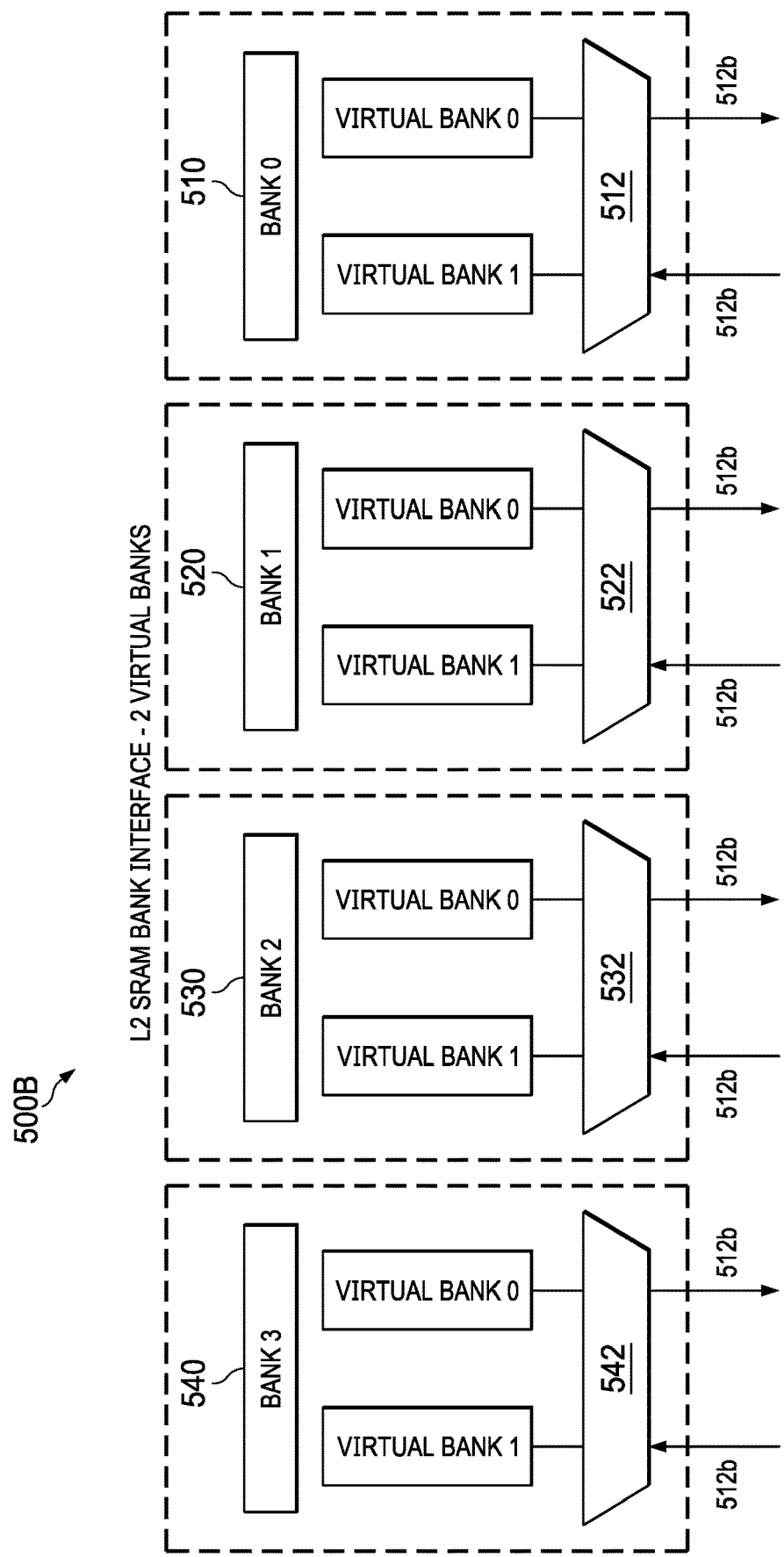
FIG. 5B shows an example level 2 memory bank interface of the system of FIG. 4 having 2 virtual banks per physical bank.

FIG. 5B shows an example level 2 memory bank interface of the system of FIG. 4 having 2 virtual banks per physical bank. For example, the interface 500B includes physical bank 510 (e.g., bank 0), physical bank 520 (e.g., bank 1), physical bank 530 (e.g., bank 2), and physical bank 540 (e.g., bank4). Each of the physical banks 510, 520, 530, and 540 respectively includes 2 virtual banks (virtual bank 0 and virtual bank 1). Each of the virtual banks of each physical bank includes a respective multiplexor/demultiplexor, so that each respective virtual bank of a given (e.g., addressed) physical bank can be written to or read from in a virtual bank memory access. Each virtual bank in a given physical bank can be successively (e.g., with overlapping or separate) virtual bank memory accesses.

With reference to FIG. 4 again, the UMC 430 includes four 512-bit wide memory ports, which can be referred to as UMC Memory Access Port (UMAP) ports. Each L2 SRAM interface (e.g., an interface of a requestor to the L2 cache) can support one new access per UMC cycle when the memory banks arranged in the SRAM can respond within each UMC cycle. Accesses to the memory banks can be pipelined over multiple UMC cycles, which can allow higher-latency memories to be used. Each of the virtual banks can include differing latencies because each interface verifies the availability of each virtual port, rather than the availability of the physical bank as a whole.

The UMC L2 SRAM protocol accommodates a memory that is connected directly to UMC 430. The UMC 430 presents address and read/write indications on the UMAP boundary, and waits for a period of time (e.g., latency) during which the L2 SRAM is "expected" to respond. The UMC 430 is able to control the four banks independently. Accesses to these virtual banks are issued serially. Consecutive requests to the same virtual bank result in a "bank conflict" if the attached memory has greater than 1 cycle pipeline latency. The second request is delayed until the first request completes. Consecutive requests to different virtual banks can proceed without delay (e.g., when the latency of a later-accessed memory is not greater than twice the 1 cycle pipelining latency).

The UMC 430 can read the returned data after the programmed access latency (e.g., in the absence of a memory error). Two different types of latencies are supported—pipeline latency, and access latency. Pipeline latency is the number of cycles that UMC has to wait before it can access the same virtual bank again. Access latency is the number of cycles that it takes for the memory to present data to UMC, after the read command has been presented. In an example system, latencies from 1 to 6 for both pipeline and access latencies are supported by the UMC 430.

Variations in latencies between differing types of SRAM can be compensated for by inserting wait states into a memory access, where the number of wait states is selected in response to the latency of the memory being accessed. One- and 2-cycle access latencies can be referred to as "0 wait-state" and "1 wait-state," respectively.

Security is the term generally applied to the protection of data in memory. The enforcement of security includes: assigning permissions to particular masters, designating memory address ranges with certain allowed actions for certain permissions, and determining whether each read and write transaction to each memory address includes sufficient privilege to access a particular address and to block accesses to the particular address to each transaction having an insufficient privilege.

Permission information includes permission possibilities construed over various axes. For example, the permission possibilities can be construed over the axes of Privilege, Hypervisor, and Secure (e.g., security) level. Along the Privilege axis, the permission possibilities include the possibilities of User or Supervisor. Along the Hypervisor (if applicable) axis, the permission possibilities include the possibilities of Root or Guest. Along the Security level axis, the permission possibilities include the possibilities of Secure or Non-secure. The permission possibilities are enforced across the three levels of caches.

Many examples of the present disclosure include at least two security states, each state having respective associated memory attributes for controlling physical and/or logical security components. The secure/non-secure state is an attribute that accompanies (or is otherwise associated with) the transaction presented by the CPU to the cache controllers. When the CPU is in a secure state (e.g., which can be indicated by a csecure attribute indicated on each of the transactions generated by the CPU), the cache controller of each of the cache levels allow the CPU to access secure and non-secure memory locations. When the CPU is in a non-secure state (e.g., which can be indicated by the csecure attribute indicated on each of the transactions generated by the CPU), the cache controller of each of the cache levels allow the CPU to access non-secure memory locations but prevents the CPU from accessing secure memory locations. The csecure attribute can be a "secure code" (e.g., where the secure code includes at least one bit of a secure status field and/or digital word status for indicating a security level of a process executing on the CPU. The secure code can be the "secure bit" as described hereinbelow with reference to FIG. 6A through FIG. 12.

In an example, the L2 firewall is used to provide security with respect to requestor-generated transactions that access the L2 SRAM and with respect to the L2-generated memory transactions that access higher levels of memory. The L2 firewall cooperates with the L3 firewall, so that the permission possibilities are accessible for controlling transactions that occur between the L2 and L3 caches. A secure firewall component is present at two interfaces: the UMC-MSMC Interface (e.g., which protect transactions initiated by the CPU that go to or towards external memory), and the UMC-L2RSAM Interface (e.g., to protect accesses that go to or towards the L2 SRAM space).

Generally, a firewall can be configured in one of two modes: a Whitelist Mode (e.g., wherein designations are listed for indicating which masters/permissions are allowed to access predetermined address regions), and a Blacklist Mode (e.g., wherein designations are listed for indicating which masters/permissions are blocked from accessing predetermined address regions). In an example, the predetermined address regions can be predetermined before a time in which the firewall blocks or allows an access to an address in a predetermined address region.

To protect a selected level of cache memory controlled by a firewall (for example), the permission information (e.g., a protection policy for granting access permission to a particular block of addresses) can be stored in the selected level of cache, so that selected regions of memory can be specifically protected by a listing of granted or denied access for respective regions to be protected. For blacklisted areas, the firewall is arranged to block accesses to any cacheable memory location (e.g., any memory location having contents that can be stored in a cache). In an example, programming the firewall to block access to a cacheable memory location by a process for which access is not explicitly whitelisted can help prevent read-only memory from being cached, and then later locally updated in the cache due to a cache hit by a process.

Address areas for which no protection is specified exist between the address areas listed in the whitelist or the blacklist of the firewall. Such areas (e.g., "gray-listed areas") can result when not every possible memory location is assigned a selected protection policy. Not associating a selected protection policy for every possible memory location can be a trade-off design choice due to the finite nature of firewall configuration resources (such as limited memory or address processing requirements).

Access to a cache protected by a firewall can be enhanced (e.g., beyond the protection by a conventional firewall without additional complexity that would otherwise entail higher complexity circuits and layout space) in certain cache operations that impact data stored in the gray-listed areas (e.g., areas disjoint to the set of the union of the blacklisted and whitelisted areas listed in the firewall). In an example, the security level of the process that generated the data stored in a particular cache line can be stored in the tag memory associated with the particular cache line (including address tag, MESI status, and the herein-described status bit), protects the data stored in a gray-listed area without, for example, increasing the complexity of the firewall (e.g., in order to narrow the scope of the gray-listed areas).

For an access request by a requestor that is allowed (e.g., not blocked) by the firewall to access a selected cache line of a selected level cache, the selected cache line can be selectively snooped (e.g., read out from the L1 cache, but kept in the line present in the L1 cache), or snoop-invalidated (e.g., read out from the L1 cache, and removed from the L1 cache), or invalidated (e.g., removed from the cache) in response to a security context of access request and in response to a stored secure code that is associated with the selected cache line, where the stored secure code indicates a security context of a process at the time the process generated the information stored in the selected cache line. For example, the selectively invalidating or evicting a selected cache line can be in response to a comparison of the security context of the access request against the security context indicated by the secure code. For example, the selectively invalidating or evicting a selected cache line can be in response to a comparison of the security context of the access request against the security context indicated by the secure code. For example, the selectively invalidating or evicting a selected cache line can be determined in response to the security context of the access request and the security context indicated by the secure code are different.

As described hereinbelow, selectively invalidating or evicting the selected cache line in response to a security context of access request and in response to a stored secure code that indicates a security context of the selected cache line can reduce the level of complexity of the firewall (e.g., to achieve a similar level of performance), can reduce the length of the time otherwise taken to flush the L1D cache (which is performed to prohibit malware from accessing cached contents, for example), and can increase the overall performance of the CPU/memory system that includes the cache of the selected cache line Evicting a reduced subset of cache lines reduces the number of CPU stalls that would otherwise (e.g., without the security matching of the memory request security context against the security context of the cache line addressed by the memory request) occur during the cache eviction process. By not evicting data having the same security context, which reduces or eliminates the latency encountered to promulgate the evicted cache information to a memory endpoint (e.g., external memory) and the latency otherwise encountered when reloading the evicted line.

In writeback caches, a value in a memory location stored in a line of cache can be modified (dirty, e.g., modified by a CPU) with respect to main memory. When the memory allocated for the modified cache line is determined to be needed for other memory, the modified cache line can be evicted. When the cache line that includes the modified value is evicted from the cache, the evicted cache line (which includes dirty memory) is progressively sent to the next higher level of reduces the length of the time otherwise taken to flush the L1D cache, which increases the overall performance of the memory system that includes the L1D cache by reducing the number of CPU stalls that occur during the cache eviction the memory hierarchy. (The evicted cache line can also be stored in a victim cache at the same level of cache hierarchy.) In response to progressively sending the dirty cache line to higher levels of cache, the corresponding portion of main memory is ultimately updated with the modified information stored in the evicted cache line. When the corresponding portion of main memory is updated with the dirty cache line, all of memory includes the modified data, so that the memory system is (for example) once again coherent and so that the modified data can be considered to be no longer dirty.

The UMC 430 (as described hereinabove with respect to FIG. 4) is coupled to control the level 2 memory 480 in response to the firewall 470. The firewall 470 includes a dedicated whitelist firewall, which can be programmed to allow/disallow access for selected L2 SRAM address regions. Each of the selected L2 SRAM address regions can be assigned a respective cache policy. The assigned respective cache policy can be a policy such as a selected permission level for each kind of access (e.g., such as memory read accesses or write accesses). Table 3 shows example caching policy assignments.

TABLE 3

| Transaction Type | Transaction Attributes (D = debug, C = cacheable, R = read, W = write) | | | Firewall Region Permissions | | | | Firewall Cache mode | Firewall Result |
|---|---|---|---|---|---|---|---|---|---|
| | D | C | R/W | D | C | R | W | CM | |
| Normal | 0 | 0 | W | — | — | — | 0 | — | Fail - No write permission |
| Write | 0 | 0 | W | — | — | — | 1 | — | Pass - Has write permission |
| Normal Read | 0 | 0 | R | — | — | 0 | — | — | Fail - No read permission |
| | 0 | 0 | R | — | — | 1 | — | — | Pass - Has read permission |

TABLE 3-continued

| Transaction Type | Transaction Attributes (D = debug, C = cacheable, R = read, W = write) | | | Firewall Region Permissions | | | | Firewall Cache mode | Firewall Result |
|---|---|---|---|---|---|---|---|---|---|
| | D | C | R/W | D | C | R | W | CM | |
| Cacheable Write | 0 | 1 | W | — | 0 | — | — | 0 | Fail - No cacheable permission (CM = 0) |
| | 0 | 1 | W | — | 1 | — | — | 0 | Pass - Has cacheable permission (CM = 0, R/W ignored) |
| | 0 | 1 | W | — | — | — | 0 | 1 | Fail - No write permission (CM = 1) |
| | 0 | 1 | W | — | — | — | 1 | 1 | Pass - Has write permission (CM = 1) |
| Cacheable Read | 0 | 1 | R | — | 0 | — | — | 0 | Fail - No cacheable permission (CM = 0) |
| | 0 | 1 | R | — | 1 | — | — | 0 | Pass - Has cacheable permission (CM = 0, R/W ignored) |
| | 0 | 1 | R | — | — | 0 | — | 1 | Fail - No read permission (CM = 1) |
| | 0 | 1 | R | — | — | 1 | — | 1 | Pass - Has read permission (CM = 1) |
| Debug Write | 1 | 0 | W | 0 | — | — | — | — | Fail - No debug permission |
| | 1 | 0 | W | 1 | — | — | — | — | Pass - Has debug permission (R/W ignored) |
| Debug Read | 1 | 0 | R | 0 | — | — | — | — | Fail - No debug permission |
| | 1 | 0 | R | 1 | — | — | — | — | Pass - Has debug permission (R/W ignored) |
| Debug Cacheable Write | 1 | 1 | W | 0 | — | — | — | — | Fail - No debug permission |
| | 1 | 1 | W | 1 | 0 | — | — | 0 | Fail - No cacheable permission (CM = 0) |
| | 1 | 1 | W | 1 | 1 | — | — | 0 | Pass - Has debug and cacheable permissions (CM = 0, R/W ignored) |
| | 1 | 1 | W | 1 | — | — | — | 1 | Pass - Has debug permission and cacheable ignored (CM = 1, debug causes R/W ignored) |
| Debug Cacheable Read | 1 | 1 | R | 0 | — | — | — | — | Fail - No debug permission |
| | 1 | 1 | R | 1 | 0 | — | — | 0 | Fail - No cacheable permission (CM = 0) |
| | 1 | 1 | R | 1 | 1 | — | — | 0 | Pass - Has debug and cacheable permissions (CM = 0, R/W ignored) |
| | 1 | 1 | R | 1 | — | — | — | 1 | Pass - Has debug permission and cacheable ignored (CM = 1, debug causes R/W ignored) |

As described with respect to FIG. 2, for example, an example L1D heterogeneous cache implementation can cache L2 SRAM address(es) for each cached line in the L1 (data) cache 223 and (L1D) victim cache 223. The management of the L1D main and victim caches and the L2 shadow copies is performed in response to a dedicated protocol/interface coupled between L1D and L2 controllers, which allows passing allocation and relocation information from the L1 to the L2 controllers. The L2 controller can respond to transactions and information from the L1 and can also create and enforce snoop transactions for maintaining I/O (DMA) coherence from non-caching requestors within the same shareability domain. The snoop transactions can cause the L2 controller to initiate changes to the shadow caches of the L2 cache and to the main/victim caches of the L1D cache.

The level 1 (e.g., L1D) controller 222 can include program-initiated cache maintenance operations (CMO) that can be selected by a programmer to manage the occupancy of the caches in the L1D and L2 controllers at a granularity of an individual cache line.

In an example described herein with reference to FIG. 4, CMO transactions can issue from a streaming engine to the L2 controller (e.g., UMC 430) via a direction transaction on a VBUSM.C protocol interface. The VBUSM.C protocol interface is arranged to intercouple the SE 422 and the UMC 430. Table 4 shows an example VBUSM.C protocol interface.

TABLE 4

| Signal mnemonic | Description | Actual Signal |
|---|---|---|
| caddress | Allocate address | caddress |
| csecure | Allocate security level | csecure |
| cvictim_address | Address of line moving out of victim cache | csband[96:53] |
| cvictim_secure | Secure bit for line moving out of victim cache | csband[52] |
| cvictim_mesi | MESI state for line moving out of victim cache | csband[51:50] |
| cvictim_valid | Valid bit for all cvictim* signals | csband[49] |
| cmain_address | Address of line moved from main cache to victim cache | csband[48:5] |
| cmain_secure | Secure bit for line moving from main cache to victim cache | csband[4] |
| cmain_mesi | MESI state for line moving from main cache to victim cache | csband[3:2] |
| cmain_valid | Valid bit for all cmain* signals | csband[1] |
| calloc | Bit indicating whether the caddress line will be allocated into main cache | csband[0] |

The VBUS.C protocol includes an example csband signal. The csband signal is a packed bus (e.g., 97-bits wide) that concatenates several sub-signals, as shown in Table 4. The csband signals are asserted to maintain coherency during certain changes in cache state (e.g., where such changes can occur in response to cache activities such as allocation of cache lines and such as updating the shadow information in the L2 controller.

At certain times, the software-initiated CMO may require evicting/invalidating a block of addresses (or a single address) for a specific security level (e.g. Secure only vs. Non-secure only). A "secure code" (e.g., "secure bit") is described herein that can be used to control the L2 cache to maintain a fine-grained control of the by evicting/invalidating of a reduced-size (e.g., minimum) subset of L1D cache lines required by the CMO request. Such need for evicting/invalidating lines of cache from the L1D can occur in response to a change of a level of a privileged mode of the CPU (e.g., from secure-to-nonsecure or from nonsecure-tosecure). Table 5 shows an example tag line of L1D cache that includes a secure bit (csecure in the bit 49 position) for each cache line in the L1D cache.

TABLE 5

| TAG NAME | 63 52 | 51 | 50 | 49 | 48 13 | 12 0 |
|---|---|---|---|---|---|---|
| L1PCTAG | Reserved | VALID | TABLE | CSECURE | TAG | Reserved |

Table 6 shows field descriptions of an example tag line of L1D cache that includes a secure bit (csecure) for each cache line in the L1D cache.

TABLE 6

| Bit | Field | Description |
|---|---|---|
| 12-0 | Reserved | Reads return 0 |
| 48-13 | TAG | Tag for cached line |
| 49 | CSECURE | Secure bit for cached line |
| 50 | TABLE BASE | Privilege bits for cached line |
| 51 | VALID | Line is present in the cache |
| 63-52 | Reserved | Reads return 0 |

Selected portions of the cache (e.g., subset of L1D cache lines) to be evicted or invalidated are determined in response to determining the status of the respective secure code for each cache line. Selecting a subset of the cache to be evicted (for example, rather than evicting all lines of the cache), reduces the length of the time otherwise taken to flush the L1D cache, which increases the overall performance of the memory system that includes the L1D cache by reducing the number of CPU stalls that occur during the cache eviction. Table 6 shows a tag line of a L1D cache, which includes a secure code bit for determining a secure status respective line.

The calloc signal is asserted to initiate read commands issued from L1D for reading an L2 cache line. The assertion of calloc (e.g. calloc==1) indicates that the given cache line (caddress+csecure) is being allocated by the L1D main cache. The csband information is used to update L1D shadow information in the L2 controller when calloc is asserted (e.g., calloc==1). When calloc is not asserted (e.g., calloc==0), the valid bits (cmain_valid and cvictim_valid) of the addressed cache line are set to 0, so that (for example) the L1D cache lines are not changed when the calloc signal is not asserted.

Generally, the same cache line (e.g., where a cache line is uniquely identified by an address and the state of the secure code) cannot be read by two requestors at the same time (e.g. while being transferred from main to victim cache, and while being transferred out of the victim cache). To help avoid this conflict, the values of the cvictim_address and the cvictim_secure (the secure bit for the L1D victim cache line) signals can be prohibited from exactly matching the respective values of the cmain_address and cmain_secure signals during the time in which the calloc signal is asserted (calloc==1) and the valid bits for the addressed cache line are set (e.g., when cmain_valid==1 and cvictim_valid==1).

The snoop and DMA transactions initiated by the L3 controller operate similarly to the CMO transactions issued by the streaming engine. For example, such snoop and DMA transactions include a secure code for indicating the security level of the process of the originating request.

The coherent read transactions issued from the MMU or the streaming engine also operate similarly to the CMO transactions issued by the streaming engine. For example, the coherent read transactions include a secure code for indicating the security level of the coherent read requests.

In various examples, the L2 controller (e.g., L2 cache controller 431) is arranged to receive from a requestor an access request that indicates a selected cache line. The L2 controller is arranged to compare a secure code of the received access request against a stored secure code that is associated with the secure context of a previous access request that wrote the present information into the selected cache line. In response to the comparison, the selected cache line can be selectively invalidated or evicted, so that a subset (e.g., a set smaller than the entire set) of selected cache lines is invalidated or evicted in response to a change in the security level (e.g., as indicated by the secure code) of the requestor.

The L2 controller is coupled to a level two data cache, which is stored L2SRAM physical structure. The L2SRAM is a monolithic endpoint RAM, and is arranged to store none, one, or two cache lines for an address indicated by an access request from a requestor. In various examples, a number of cache lines for a single cacheable address that can be stored in the L2SRAM is equal to the number of security levels that can be indicated by the secure code of the received access request. In an example, the secure code is a bit (e.g., the "secure bit"), so that data for storing in a given cacheable address can be stored in a first cache line associated with the first possible value of the secure code (e.g., when the secure bit is 0), and so that data for storing in the given cacheable address can be stored in a second cache line associated with the second possible value of the secure core (e.g., when the secure bit is 1).

Coherency is maintained by including a field (e.g., a bit field) for the secure code (e.g., a secure bit) in each of the L1D tags, L2 tags, and L2 shadow tags. When an access request results in information being written into a cache line for any of the L1D tags, L2 tags, and L2 shadow tags, the secure code (e.g., secure bit) of (e.g., included by) the access request is further propagated to the other caches that include (or are to include) the information of the cache line indicated by the access request.

The access request includes a secure code for indicating a security level of the security context of the requestor initiating the access code. As described hereinbelow, the secure code (e.g., secure bit) can be included in an L1D tag, a CMO or Snoop transaction, an MMU or SE read transaction, and a DMA read/write transaction. An L2 snoop transaction to L1D includes the secure code of the originating CMO/Snoop/Read/DMA transaction request.

When a transaction is processed by the L2 controller that requires a lookup in the shadow copy of the L1D main or victim cache tags, the L2 controller evaluates the secure code of the cache line addressed by the transaction being processed to determine a "hit" or a "miss" (e.g., by the access to the L1D cache line). For example, a hit is determined for the incoming transaction: 1) in response to detecting a match between the stored secure code of the addressed cache line in the shadow tags and the secure code of the incoming transaction; AND 2) in response to detecting a match between an address of a cached line in the shadow tags and the cache line address of the incoming transaction. In the example, a miss is determined for the incoming transaction: 1) in response to not detecting a match between the stored secure code of the addressed cache line in the shadow tags and the secure code of the incoming transaction; OR 2) in response to not detecting a match between an address of a cached line in the shadow tags and the cache line address of the incoming transaction.

To help ensure the L1D accurately performs its own hit/miss detection of subsequent snoop transactions processed by the L1D, the secure code associated with the most recent cache line hit by the L2 controller can be transferred to the L1D controller. The secure code associated with the most recently cache line hit by the L2 controller can be transferred to the L1D controller via a snoop transaction initiated by the L2 controller (via the VBUSM.C bus interface protocol signaling) in response to the most recent cache line hit (e.g., that includes the hit/miss detection in response to the state of the secure code).

In contrast, conventional solutions lack a secure code in the cache tags that indicates a security level of the requestor context by which the cache line was tagged. Such a lack of retaining the security level of the requestor context by which the cache line was tagged can result in gross security control faults (e.g., because the distinction between secure and non-secure contexts security level of the requestor context by which the cache line was tagged can potentially allow an access request to be processed at a security level different from the security level of the requestor context by which the cache line was tagged.

The distinction between secure and non-secure contexts in the cache tags enables fine-grained cache eviction/invalidation of cache lines stored under a first context, for example, without impacting the caching performance of cache lines stored under a context different from the first context. In an example where a non-secure cache line is invalidated via a CMO operation, the secure line can remain in the cache, which results in an improved caching performance of the cache line stored in the secure software context. For example, this improvement can occur in cases where both the cache line stored in the non-secure software context and the cache line stored in the secure software context share the same tagged address in the same cache.

The efficiency of L2 controller to accurately perform coherent snoop operations to the L1D can be improved by performing the coherent snoop operations to the L1D for the subset of cases in which both the cached addresses and the security levels for the addressed cache line and the access request are the same. The selection—of which coherent snoop operations to the L1D are to be initiated—can be determined in response to evaluating the security level of the software context indicated by the secure code (e.g., the state of the secure bit) of the transaction, where the state of secure bit is stored in the cache tags in L1D (main or victim) cache and is also stored/maintained in the shadow copy of the L1D/L2 cache tags in the L2 cache.

Figure 6A:
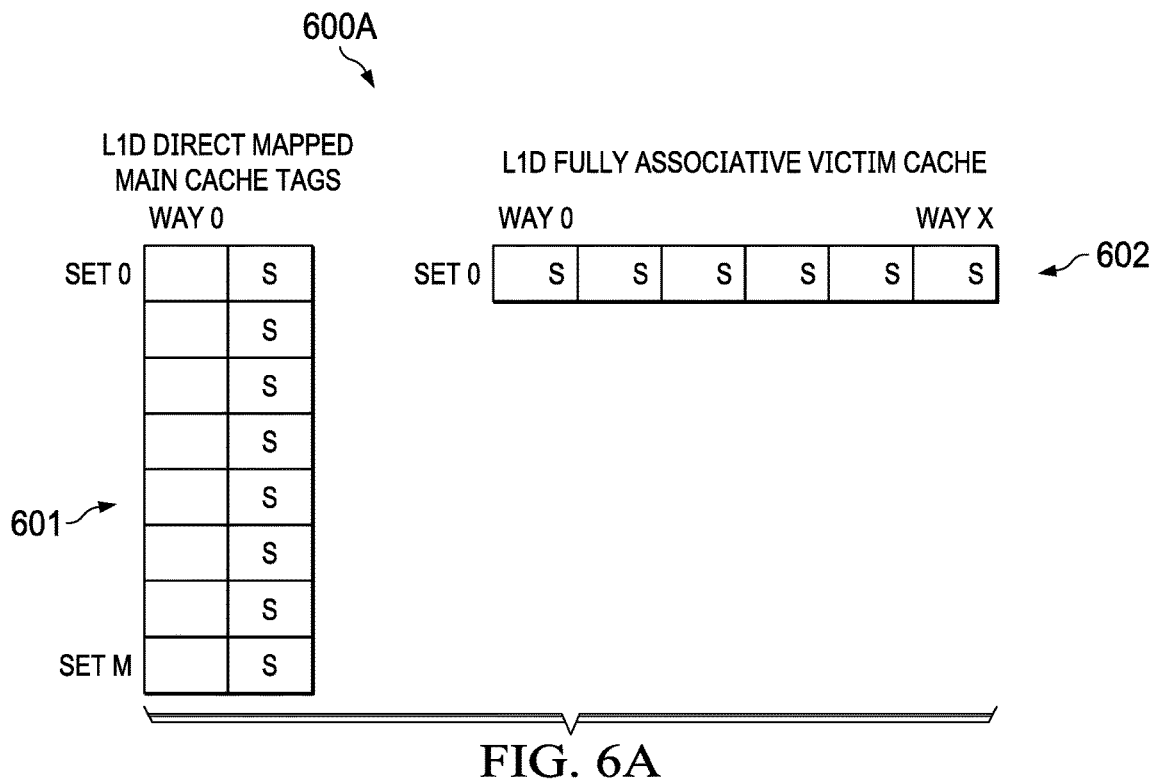
FIG. 6A shows example L1D (level 1 data) controller physical structures.

FIG. 6A shows example L1D (level 1 data) controller physical structures. For example, the level 1 data controller 600A includes main cache tags 601 and victim cache tags 602. The main cache tags 601 are arranged to track (e.g., for a respective main cache line) address tags, MESI, and a security level (e.g., indicated by the secure code) of the process by which the respective cache line data was last modified. The victim cache tags 602 are arranged to track (e.g., for a respective victim cache line) address tags, MESI, and a security level (e.g., indicated by the secure code) of the process by which the respective cache line data was last modified.

The L1D main cache 601 is a direct-mapped cache that services read and write hits and snoops. The L1D main cache 601 maintains a current MESI state that can be modified a) in response to the read, write, and snoop accesses and b) in response to the secure code (e.g., secure bit). The L1D main cache 601 is a read-allocate cache. Write accesses from the CPU that miss the cache are sent (e.g., forwarded) to the L2 without requiring allocating a cache line in the L1D main cache 601. Due to the direct mapped design of the L1D cache, when a new allocation takes place, the current line in the set is moved (e.g., evicted) to the victim cache 602, regardless of whether the current line in the set is clean or dirty.

The L1D victim cache 602 is a fully associative structure that holds lines that have been removed (e.g., evicted) from the main cache 601 due to replacement (e.g., in response to the write from the CPU). The L1D victim cache 602 holds both clean and dirty lines. The L1D victim cache services read and write hits and snoops (e.g., received from the CPU), while maintaining a correct MESI in response to the read, write and snoop accesses that hit the L1D victim cache 602 (e.g., when the cached line includes an address and a secure code that matches an address and a secure code of the read, write, or snoop access transaction). When a line in the modified state (e.g., dirty) is removed (e.g., evicted) from the victim cache, it is sent to the L2 main cache (described hereinbelow with reference to FIG. 6B) as a victim.

Figure 6B:
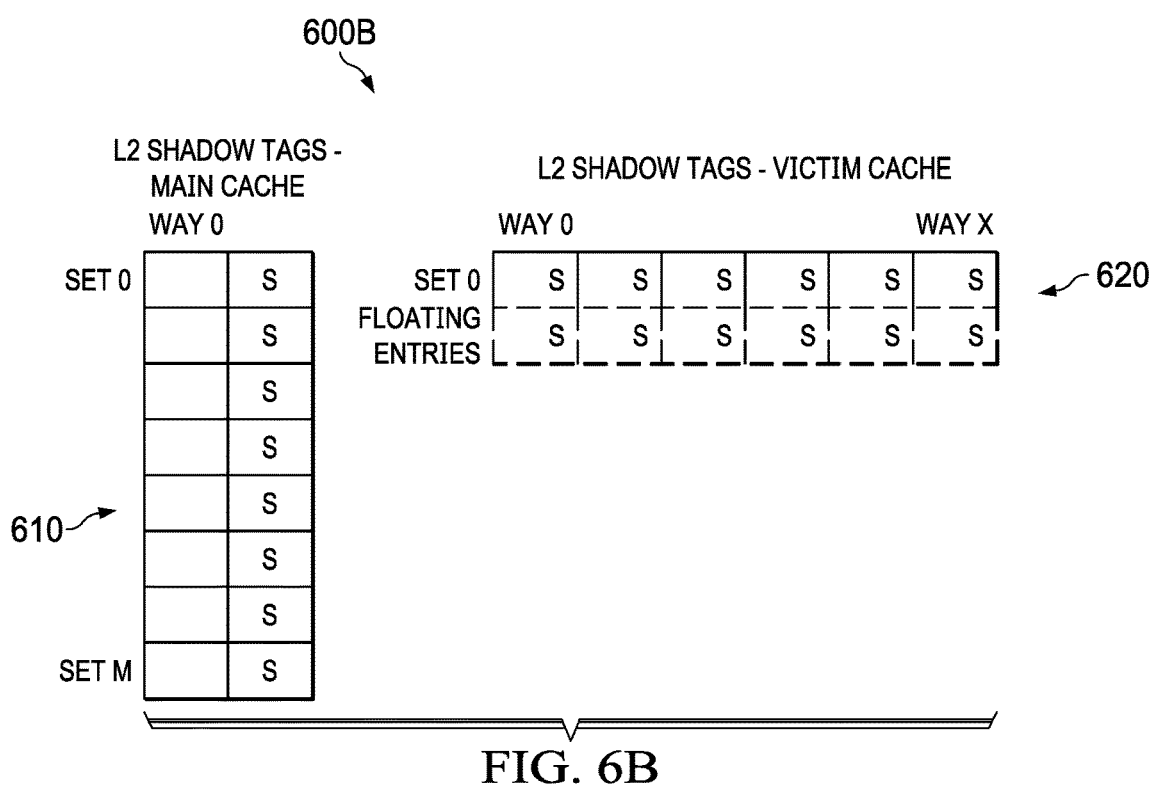
FIG. 6B shows example level 2 (L2) controller physical structures.

FIG. 6B shows example level 2 (L2) controller physical structures. For example, the level 1 data controller 600B includes main cache tags 610 and victim cache tags 620. The main cache tags 610 are arranged to track (e.g., for a respective main cache line) address tags, MESI, and a security level (e.g., indicated by the secure code) of the process by which the respective cache line data was last modified. The victim cache tags 620 are arranged to track (e.g., for a respective victim cache line) address tags, MESI, and a security level (e.g., indicated by the secure code) of the process by which the respective cache line data was last modified. The victim cache 620 include floating entries include cache tag information for entries addressed by a same "way."

The L2 cache is a unified cache that is arranged to service requests from multiple requestors of various types. The requestor types can include the types of requestors such as a L1D data memory controller (L1D DMC), a UP program memory controller (PMC), a streaming engine (SE), a MMU (memory management unit), and an L3 MSMC (multicore shared memory controller).

The L2 cache is non-inclusive with the L1D and L1P, so that the L2 is not required to include all cache lines stored in the L1D and L1P caches. In this scheme, some lines can be cached in both levels of the hierarchy. The L2 cache is also non-exclusive, so that cache lines are not explicitly prevented from being cached in both the L1 and L2 caches at the same time. In an example operation that includes allocation and random replacement of cache lines, the cache lines can be present in one, both, or neither of the L1D and L2 caches. In like manner, like cache lines can be stored in the L1P and L2 caches at the same time.

Figure 7A:
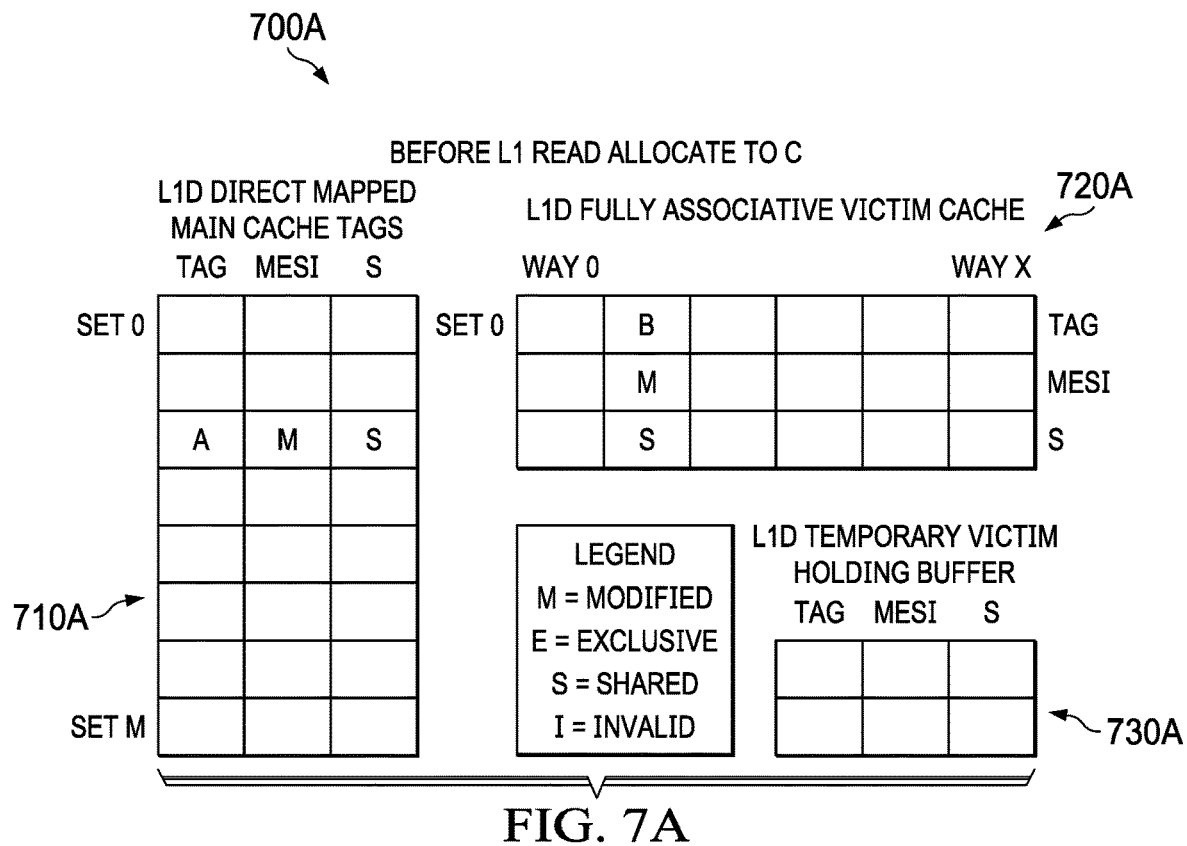
FIG. 7A shows example level data (L1D) cache tag values before an example cache operation.

FIG. 7A shows example level data (L1D) cache tag values before an example cache operation. For example, the level 1 data controller 700A includes main cache tags 710A, victim cache tags 720A, and a temporary victim holding buffer 730A. The main cache tags 710A are arranged to track (e.g., for a respective main cache line) address tags, MESI, and a security level "S" associated with the security context of the process originating the cache line. The column of "S" in main cache tags 710A (and other cache tags having a secure code memory for the storing the security level S) is an example first-level-cache secure code list. The victim cache tags 720A are arranged to track address tags, MESI, and a security level of the process by which the respective entries includes cache tag information an entry being evicted (e.g., so that the victim cache be loaded by a victim cache line without (for example) having to wait for the evicted cache line to be sent to higher cache levels).

An example state of L1D data structures in the level 1 data controller 700A is shown as a state before an example allocation of line C by the L1D controller. In the example, a selected line A is stored in the main cache tags 710A as having a modified ("M" MESI) and a secure code of S (e.g., a secure bit of either 1 or 0) of the originating process of the cache line A. At the same time, a selected way of victim cache tags 720A includes a cache line B as having a modified state and a secure code of S of the originating process of the cache line B. At the same time, the L1D temporary victim holding buffer is empty.

As described herein following, an L1D cache line allocation access command is received, so that in response the received allocation access command, a modified cache line of the main cache tags 710A is transferred to the victim cache tags 720A, so that the cache line evicted from the victim cache tags 720A (e.g., which is evicted to make room on behalf of the modified cache line being transferred from main cache tags 710A), is transferred from the victim cache tags 720A to the L1D temporary victim holding buffer (e.g., to eventually be sent to the L2 level cache).

Figure 7B:
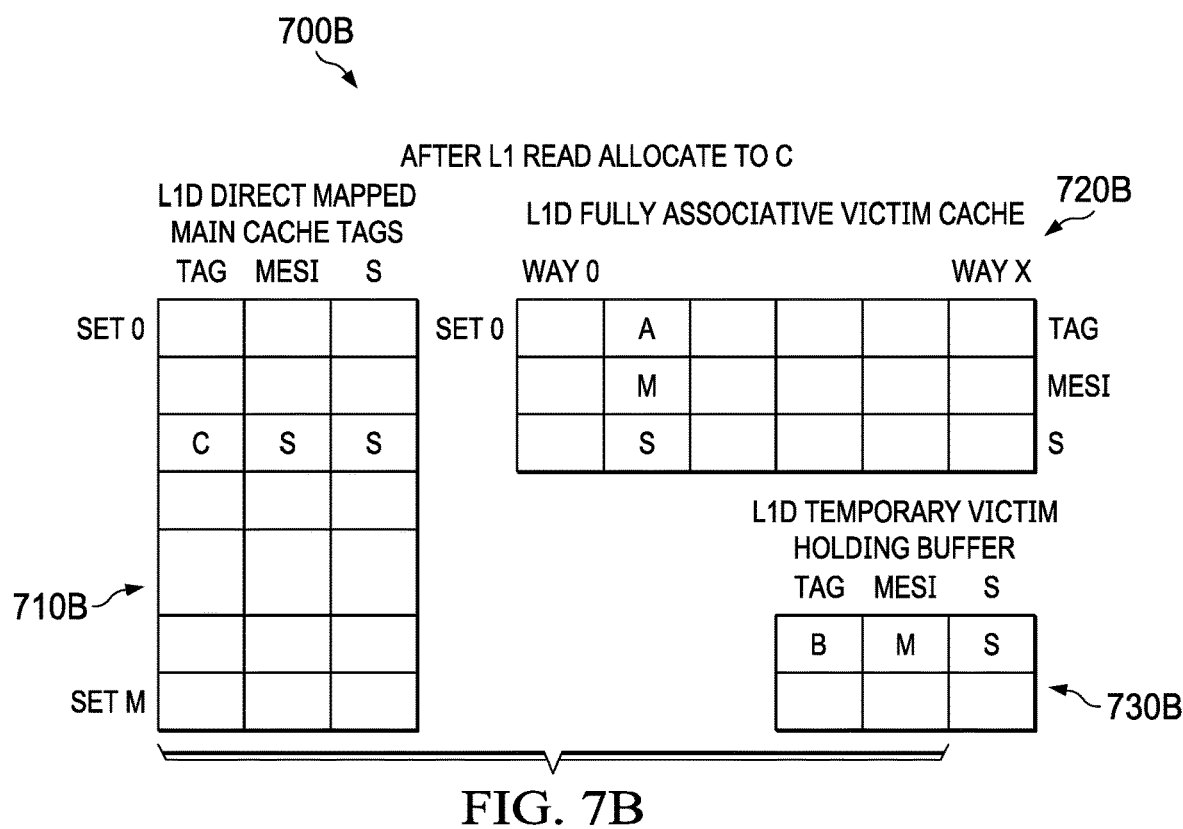
FIG. 7B shows example level data (L1D) cache tag values after an example cache operation.

FIG. 7B shows example level data (L1D) cache tag values after an example cache operation. For example, the level 1 data controller 700B includes main cache tags 710B, victim cache tags 720B, and a temporary victim holding buffer 730B. In the example, the main cache tags 710B, victim cache tags 720B, and a temporary victim holding buffer 730B show the values of the respective L1D data structures after the allocation of line C by L1D controller.

In the example cache operation, the L1D cache allocates a new line in the main cache tags 810B at address C (e.g., cache line C), which initiates the transfer of cache line A (e.g., from the main cache tags 710A) to a respective way of the victim cache tags 720B. In response to the transfer of cache line A to a respective way of the victim cache tags 720B, the cache line B is transferred from the respective way of the victim cache to the L1D temporary victim holding buffer 730B. The cache line B is stored in the L1D temporary victim holding buffer 730B pending a subsequent transmission of line B to the L2 level cache.

Figure 8A:
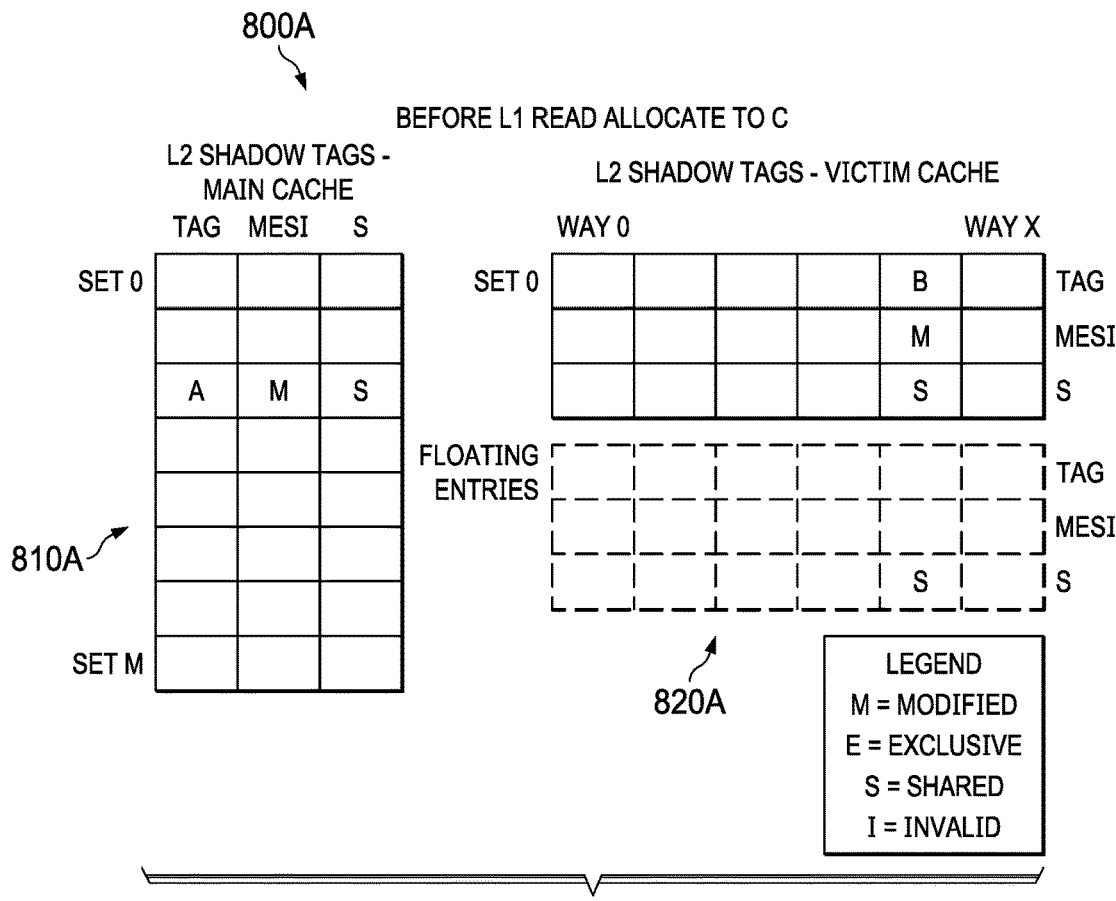
FIG. 8A shows example L2 shadow structures before an example cache operation.

FIG. 8A shows example L2 shadow structures before an example cache operation. For example, the level 2 data controller 800A includes L2 shadow main cache tags 810A and L2 shadow tags victim cache 820A. The L2 data controller 800A maintains a shadow copy of the address tag, MESI state information, and security information for each of the cache lines held in the L1D main cache (e.g., in main cache tags 710A, and then as modified in 710B). The L2 shadow main cache tags 810A of the main cache entries 710A allow the L2 controller to correctly track each of the main cache lines that are cached in the L1D, so that that the L2 controller can correctly (and quickly, e.g., without having to poll all of the L1D main cache entries) determine when to send snoop transactions to perform exactly one of a) read or b) invalidate cache lines in the L1D.

The L2 data controller 800A also maintains a shadow copy of the address tag and MESI state information for each of the cache lines held in the L1D victim cache (e.g., in victim cache tags 820). The L2 shadow tags victim cache 820A of the victim cache entries (e.g., in victim cache tags 720A, and then as modified in 720B) allow the L2 controller to correctly track the main cache lines that are cached in the L1D, so that that the L2 controller can accurately determine when to send snoop transactions to the L1D controller.

Maintaining the L1D cache tags (e.g., of the L1 main cache tags 710A and the L1 victim cache tags 720A) as L2 shadow tags reduces the inter-level cache access latency that would otherwise be longer (e.g., without the shadow tags). If the shadow tags were not maintained in the L2, then the L2 controller would be forced to snoop the L1D for each request that could possibly be held in the L1D main or victim caches, which would significantly degrade interface performance due to the large increase of the resulting snoop traffic bandwidth.

An example state of L1D data structures in the level 2 data controller 800A is shown as a state before the example cache operation (e.g., the allocation of line C by the L1D controller). In the example, a selected line A (previously copied from main cache tags 710A) is stored in the L2 shadow main cache tags 810A as having a modified ("M" in MESI) and a secure code of S (e.g., a secure bit of either 1 or 0) of the originating process of the cache line A. At the same time, a selected way of L2 shadow tags victim cache 820A (as previously copied from the victim cache tags 720B) includes a cache line B as having a modified state and a secure code of S of the originating process of the cache line B. At the same time, the floating entries of the L2 shadow tags victim cache 820A are empty, which reflects the state of the L1D temporary victim holding buffer (L2 shadow tags victim cache 820A) being empty. The column of "S" in main cache tags 810A and other columns of "S" in other L2 cache tags that include a secure code memory for the storing the security level "S" are each examples of a respective second-level-cache secure code list.

As described herein following, an L1D cache line allocation access command is received, so that in response the received allocation access command, a modified cache line of the main cache tags 710A is transferred to the victim cache tags 720A, so that the cache line evicted from the victim cache tags 720A, is transferred from the victim cache tags 720A to the L1D temporary victim holding buffer.

Figure 8B:
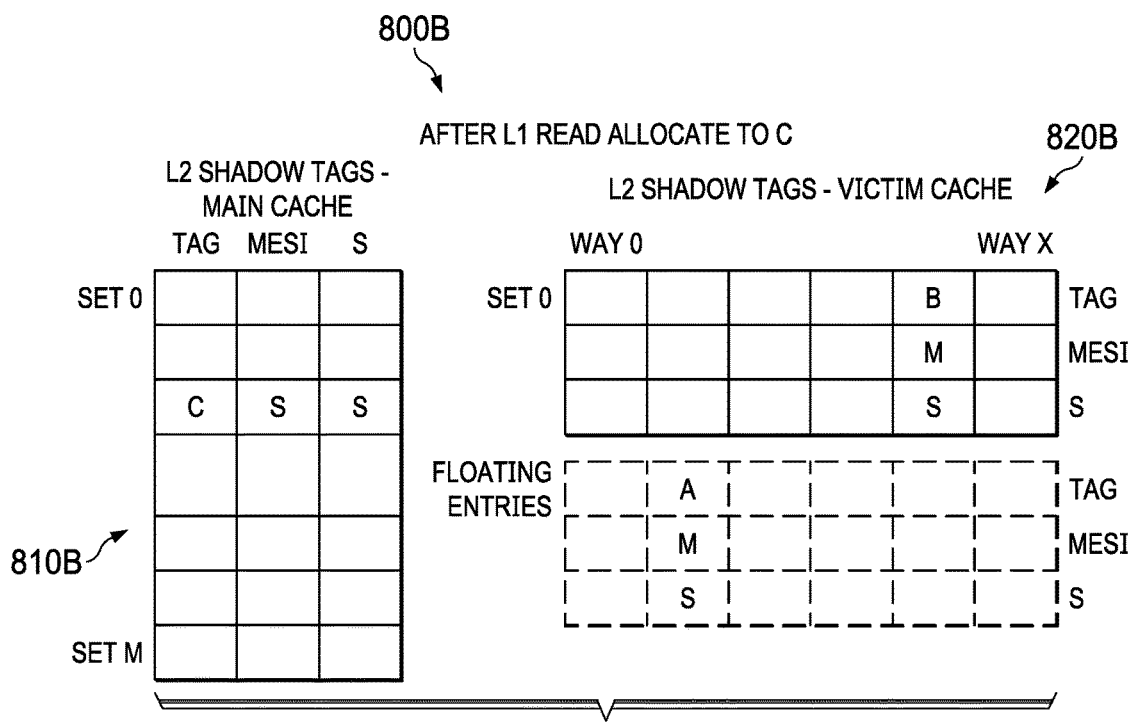
FIG. 8B shows example L2 shadow structures after L1D allocation of a line with modified lines moving from main to victim cache, and from victim cache to L2.

FIG. 8B shows example L2 shadow structures after L1D allocation of a line with modified lines moving from main to victim cache, and from victim cache to L2. For example, the level 2 data controller 800B includes main cache tags 810B and L2 shadow tags victim cache 820B. In the example, the main cache tags 810B and the L2 shadow tags victim cache 820B show the values of the respective L1D data structures after being transferred to the level 2 data controller 800A after the allocation of line C by the L1D controller.

In the example cache operation, the L1D cache allocates a new line at address C (e.g., cache line C) in the main cache tags 810B, which initiates the transfer of cache line A (e.g., from the main cache tags 710A) to a respective way of the victim cache tags 720B. In response to the allocation of a new line at address C (e.g., cache line C) in the main cache tags 710B, the line at address C (e.g., cache line C) in the main cache tags 710B is allocated in (and/or copied to) a respective line at address C (e.g., cache line C) in the main cache tags 810B.

In response to the transfer of cache line A to a respective way of the victim cache tags 720B, the cache line B is transferred from the respective way of the victim cache to the L1D temporary victim holding buffer 730B. The cache line B is stored in the L1D temporary victim holding buffer 730B pending a subsequent transmission of line B to the L2 level cache (e.g., when access is granted for a victim write operation by which a memory endpoint (e.g., external memory) is updated.

Figure 9A:
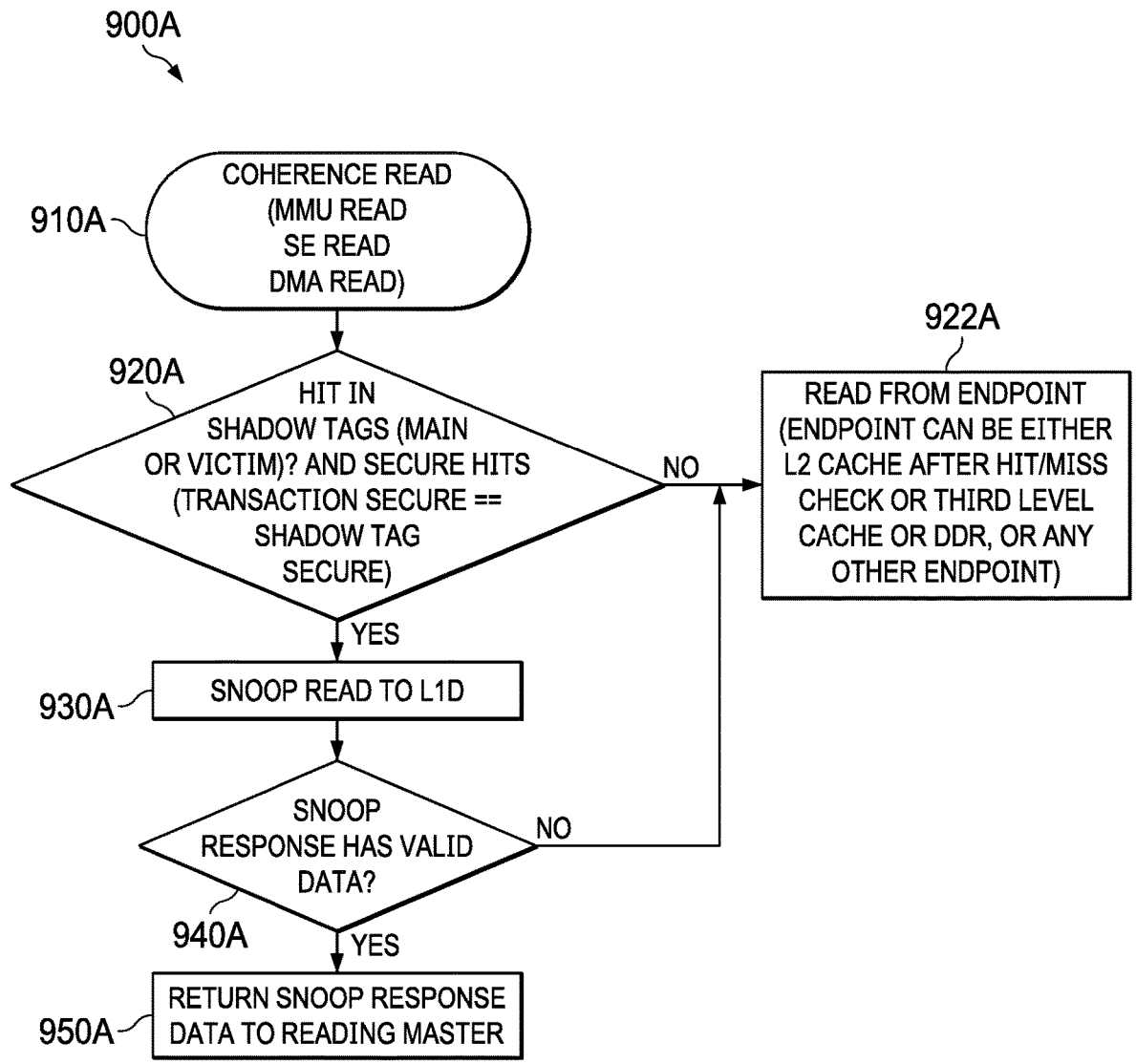
FIG. 9A is a flow diagram of an example process for a coherent read operation in a multi-level caching system.

FIG. 9A is a flow diagram of an example process for a coherent read operation in a multi-level caching system. A coherent read operation is an example of a cache coherency operation. The process 900A is an example process such as a coherent read operation that is initiated as an MMU read operation, SE read operation, or a DMA read operation. The process 900A is initiated at operation 910A.

At operation 910A, a coherent read operation is generated by an MMU, an SE, or a DMA controller and is sent to an L2 controller (e.g., UMC 430).

At operation 920A, the coherent read operation generated by the MMU, the SE, or the DMA controller is received by an L2 controller (e.g., UMC 430). The L2 controller is arranged to determine whether the received coherent read operation causes both an L2 shadow tag hit and a secure hit (e.g., security code match). An L2 shadow tag hit occurs in response to a coherent read address of the received coherent read operation matching an address that is tagged in either of the L2 shadow tags of the L2 shadow main cache or the L2 shadow victim cache. The secure hit occurs in response to determining a match between the secure code of the received coherent read operation and a secure code stored in the cache line that is hit by the received coherent read operation. In response to a determination of an affirmative comparison that the received coherent read operation causes both an L2 shadow tag hit and a secure hit, the process 900A continues at operation 930A. In response to a determination the received coherent read operation does not cause both an L2 shadow tag hit and a secure hit, the process 900A continues at operation 922A.

At operation 922A, the L2 controller locally generates a coherent read command in response to (e.g., for fulfilling) the received coherent read operation and sends the locally generated coherent read command to a memory endpoint (e.g., so that the memory endpoint can return the requested coherent read data to the requestor that generated and sent the coherent read operation received by the L2 controller). The endpoint can be the L2 cache, an external memory, or any other endpoint.

At operation 930A, the L2 controller locally generates a snoop read request in response to a determination the received coherent read operation causes both an L2 shadow tag hit and a secure hit. The L2 controller sends the snoop read request to a lower level cache (e.g., the L1D), so that (for example) the L2 cache can be kept coherent with the lower level cache.

At operation 940A, the L2 controller determines whether the snoop response (e.g., which is generated and sent by the lower level cache controller in response to the snoop read request sent by the L2 controller) indicates the cache line that is snooped contains valid data. In response to a determination the snoop response includes valid data, the process 900A continues at operation 950A. In response to a determination the snoop response does not include valid data, the process 900A continues at operation 922A.

At operation 950A, the L2 controller returns (e.g., forwards) data included by the snoop response to the reading master (e.g., the requestor that generated and sent the coherent read operation received by the L2 controller).

Figure 9B:
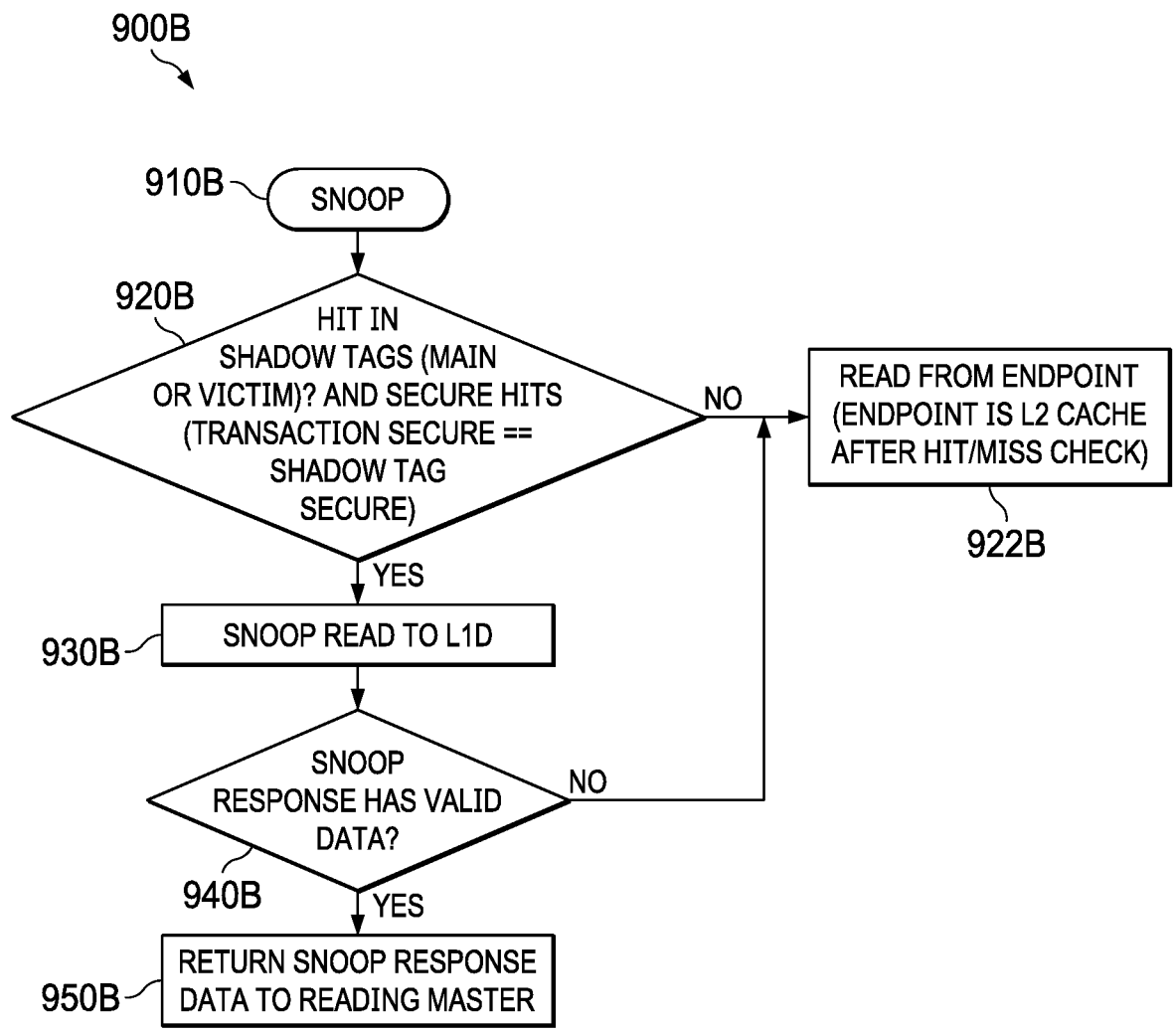
FIG. 9B is a flow diagram of an example process for a snoop read operation in a multi-level caching system.

FIG. 9B is a flow diagram of an example process for a snoop read operation in a multi-level caching system. The snoop read operation is an example of a cache coherency operation. The process 900B is an example process such as a snoop operation that is initiated as an MMU read operation, SE read operation, or a DMA read operation. The process 900B is initiated at operation 910B.

At operation 910B, a snoop operation is generated by the level-3 cache and/or next higher-level cache).

At operation 920B, the snoop operation generated by the level-3 cache and/or next higher-level cache) is received by an L2 controller (e.g., UMC 430). The L2 controller is arranged to determine whether the received snoop operation causes both an L2 shadow tag hit (e.g., address match) and a secure hit (e.g., security code match). An L2 shadow tag hit occurs in response to a snoop read address of the received snoop read operation matching an address that is tagged in either of the L2 shadow tags of the L2 shadow main cache or the L2 shadow victim cache. The secure hit occurs in response to determining a match between the secure code of the received snoop read operation and a secure code stored in the cache line that is hit by the received snoop read operation. In response to a determination of an affirmative comparison that the received snoop read operation causes both an L2 shadow tag hit and a secure hit, the process 900B continues at operation 930B. In response to a determination the received snoop read operation does not cause both an L2 shadow tag hit and a secure hit, the process 900B continues at operation 922B.

At operation 922B, the L2 controller locally generates a read command to read data from a memory endpoint (e.g., closest valid cache entry or external memory) in response to (e.g., for fulfilling) the received snoop read operation from the level-3 cache (or next higher-level cache). For example, the closest valid cache entry can be the L2 cache when an hit/miss check indicates the snooped-for cache line is present in the L2 cache. If the line is not present in the L2 cache, the read command can be forwarded to a next-lower level cache or towards another endpoint.

At operation 930B, the L2 controller locally generates a snoop read request in response to a determination the received snoop read operation causes both an L2 shadow tag hit and a secure hit. The L2 controller sends the snoop read request to a lower level cache (e.g., the L1D), so that (for example) the L2 cache can be kept coherent with the lower level cache.

At operation 940B, the L2 controller determines whether the snoop response (e.g., which is generated and sent by the lower level cache controller in response to the snoop read request sent by the L2 controller) indicates the cache line that is snooped contains valid data. In response to a determination the snoop response includes valid data, the process 900B continues at operation 950B. In response to a determination the snoop response does not include valid data, the process 900B continues at operation 922B.

At operation 950B, the L2 controller returns (e.g., forwards) data included by the snoop response to the reading master (e.g., the requestor that generated and sent the snoop read operation received by the L2 controller).

Figure 9C:
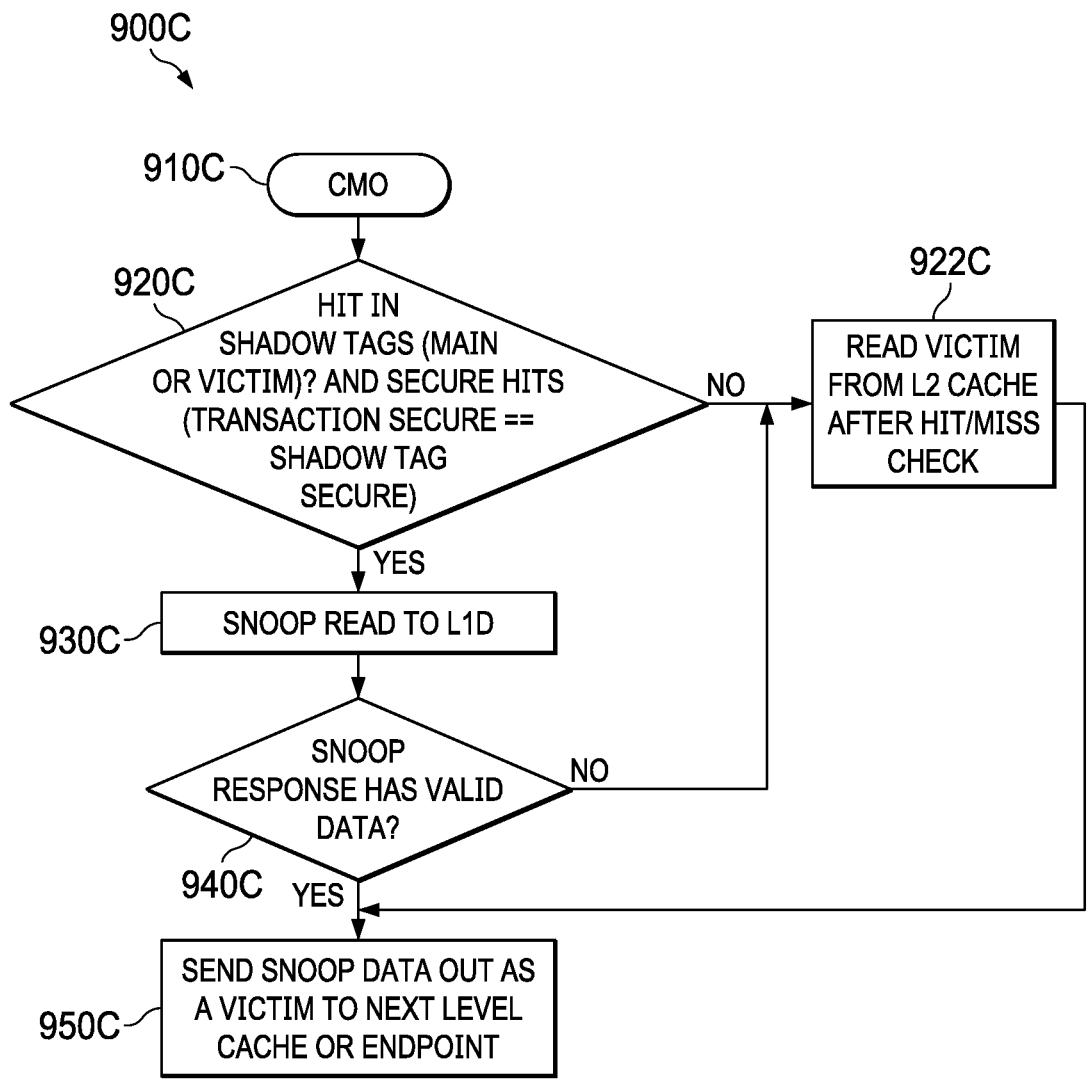
FIG. 9C is a flow diagram of an example process for a CMO (cache maintenance operation) read operation in a multi-level caching system.

FIG. 9C is a flow diagram of an example process for a CMO (cache maintenance operation) read operation in a multi-level caching system. The CMO read operation is an example of a cache coherency operation. The process 900C is an example process such as a CMO operation that is initiated as a CPU-generated CMO operation. The process 900C is initiated at operation 910C.

At operation 910C, a CMO operation is generated by the CPU and is sent via the SE to an L2 controller (e.g., UMC 430). The generation of the CMO is described in U.S. Pat. No. 10,599,433, which is incorporated herein by reference in its entirety and for all purposes. In an example, the CMO operation inherits the secure level of the process that is running on the CPU (e.g., where the secure code is determined in response to the inherited secure level). A secure process of the CPU generates the CMO to include a target address and a secure code set to indicate the secure process by which the CMO is generated. CMO operations can be used to evict or remove less-frequently used lines from the caches, where the lines selected to be evicted or removed are line that match the secure code of the process that generated the CMO.

At operation 920C, the snoop operation generated by the CPU is received by an L2 controller (e.g., UMC 430). The L2 controller is arranged to determine whether the received CMO operation causes both an L2 shadow tag hit and a secure hit (e.g., security code match). An L2 shadow tag hit occurs in response to a CMO address of the received CMO operation matching an address that is tagged in either of the L2 shadow tags of the L2 shadow main cache or the L2 shadow victim cache. The secure hit occurs in response to determining a match between the secure code of the received CMO operation and a secure code stored in the cache line that is hit by the received CMO operation. In response to a determination of an affirmative comparison that the received CMO operation causes both an L2 shadow tag hit and a secure hit, the process 900C continues at operation 930C. In response to a determination the received CMO operation does not cause both an L2 shadow tag hit and a secure hit, the process 900C continues at operation 922C.

At operation 922C, the L2 controller locally reads a victim cache line in response to the received CMO read operation. The data from the victim is packaged as snoop data for forwarding as a snoop request to for sending out to a next level cache or endpoint (e.g., in operation 950C) and sends the locally generated read command to a memory endpoint.

At operation 930C, the L2 controller locally generates a snoop read request in response to a determination the received CMO read operation causes both an L2 shadow tag hit and a secure hit. The L2 controller sends the snoop read request to a lower level cache (e.g., the L1D), so that (for example) the L2 cache can be kept coherent with the lower level cache.

At operation 940C, the L2 controller determines whether the snoop response (e.g., which is generated and sent by the lower level cache controller in response to the snoop read request sent by the L2 controller) indicates the cache line that is snooped contains valid data. In response to a determination the snoop response includes valid data, the process 900C continues at operation 950C. In response to a determination the snoop response does not include valid data, the process 900C continues at operation 922C.

At operation 950C, the L2 controller returns (e.g., forwards) data included by the snoop response (e.g., from either operation 922C or operation 940C) to the reading master (e.g., the requestor that generated and sent the CMO operation received by the L2 controller).

Figure 10:
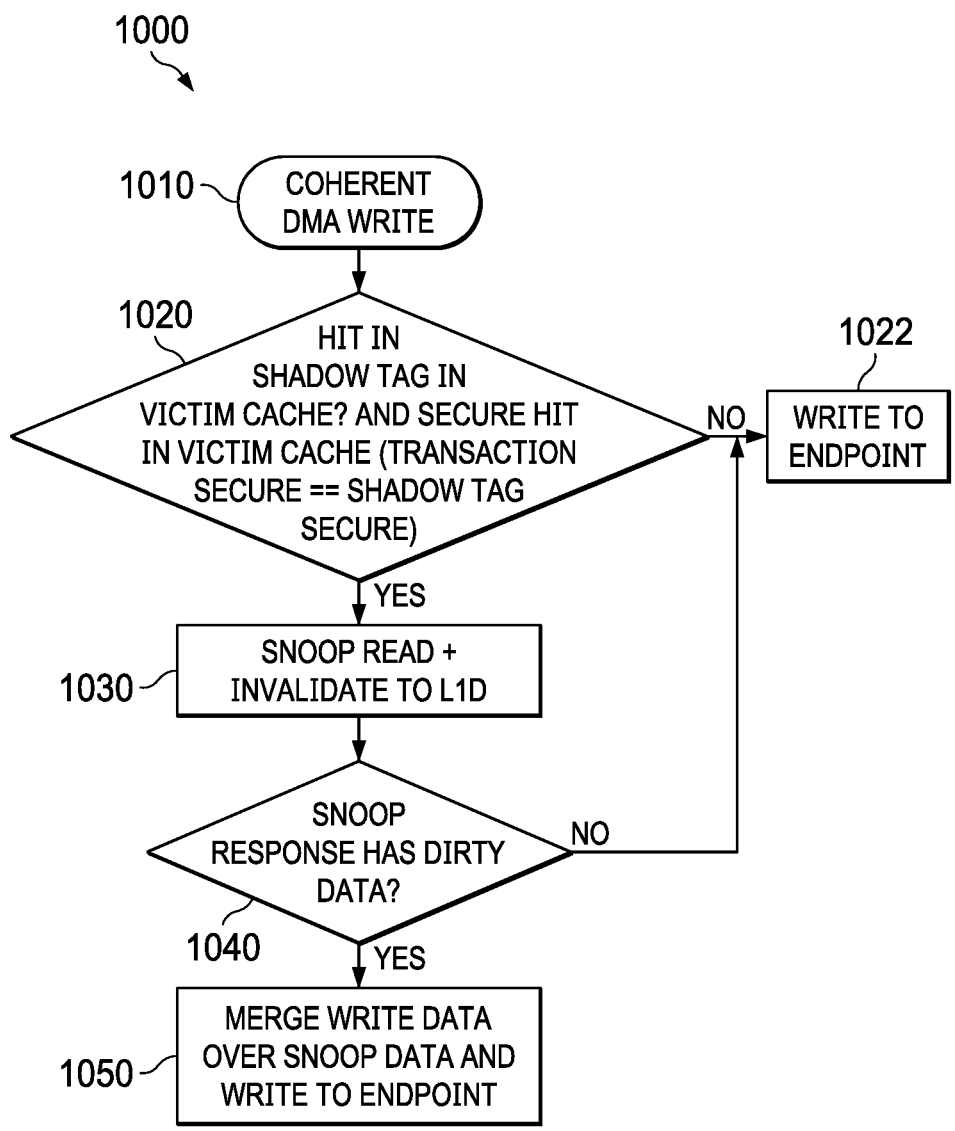
FIG. 10 is a flow diagram of an example process for a DMA write operation in a multi-level caching system.

FIG. 10 is a flow diagram of an example process for a DMA write operation in a multi-level caching system. The process 1000 is an example process such as a coherence DMA write operation that is initiated by a DMA controller. The process 1000 is initiated at operation 1010.

At operation 1010, a DMA write operation is generated by a DMA controller and is sent to an L2 controller (e.g., UMC 430). In an example, the DMA write operation is sent to the L2 controller via the MSMC 461.

At operation 1020, the DMA write operation generated is received by the L2 controller (e.g., UMC 430). The L2 controller is arranged to determine whether the received DMA write operation causes an L2 shadow tag hit and a secure hit (e.g., secure code match). An L2 shadow tag hit occurs in response to a DMA write address of the received DMA write operation matching an address that is tagged in either of the L2 shadow tags of the L2 shadow main cache or the L2 shadow victim cache. The secure hit occurs in response to determining a match between the secure code of the received DMA write operation and a secure code stored in the cache line that is hit by the received CMO operation. In response to a determination of an affirmative comparison that the received DMA write operation causes both an L2 shadow tag hit and a secure hit, the process 1000 continues at operation 1030. In response to a determination the received DMA write operation does not cause both an L2 shadow tag hit and a secure hit, the process 1000 continues at operation 1022.

At operation 1022, the L2 controller locally generates a write command in response to (e.g., for fulfilling) the received DMA write operation and sends the locally generated DMA write command to a memory endpoint. The endpoint can be the L2 SRAM memory, the L3 cache, an external memory, or any other endpoint.

At operation 1030, the L2 controller locally generates a snoop read request in response to a determination the received DMA write operation causes an L2 shadow tag hit. The L2 controller sends the snoop read request to a lower level cache (e.g., the L1D), so that the snoop requested cache line of lower level cache (e.g., the L1D is invalidated).

At operation 1040, the L2 controller determines whether the snoop response (e.g., which is generated and sent by the lower level cache controller in response to the snoop read request sent by the L2 controller) indicates the cache line that is snooped contains dirty (e.g., modified) data. In response to a determination the snoop response includes dirty data, the process 1000 continues at operation 1050. In response to a determination the snoop response does not include dirty data, the process 1000 continues at operation 1022.

At operation 1050, the L2 controller merges the DMA write data over the data included by the snoop response and writes the merged response to the endpoint.

Figures 11, 12:
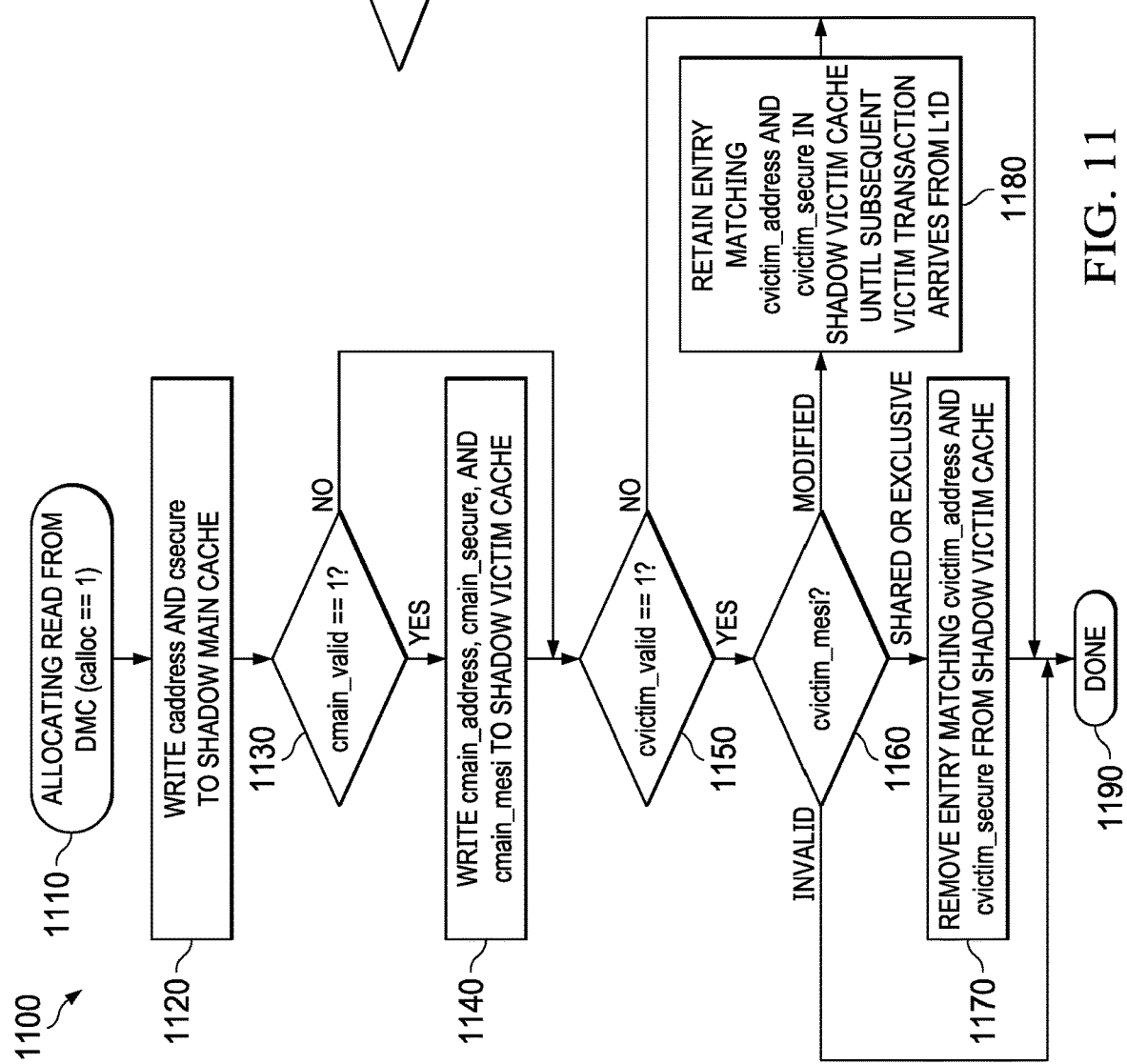
FIG. 11 is a flow diagram of an example process for a read allocation operation in a multi-level caching system.
FIG. 12 is a flow diagram of an example process for a victim write operation in a multi-level caching system.

FIG. 11 is a flow diagram of an example process for a read allocation operation in a multi-level caching system. The process 1100 is an example process such as a read allocation operation that can be initiated in response to a read allocation operation received from a lower level controller (e.g., the L1D). The process 1100 is initiated at operation 1110.

At operation 1110, a read allocation operation request is sent to an L2 controller (e.g., UMC 430) by a lower level data memory controller (e.g., DMC 361). In an example, the request can be signaled by setting the signal calloc high.

At operation 1120, the address of the received allocating read signal (caddress) and the secure code of the of the received allocating read signal are written (and tagged) to the L2 shadow main cache (e.g., so the that the L2 shadow main cache is arranged to shadow the L1D main cache). The caddress and the csecure bit uniquely indicate the cache line targeted by the received allocating read signal.

At operation 1130, the L2 controller determines whether the valid bit (cmain_valid) for the indicated cache line in the L2 shadow main cache is set. In response to a determination the valid bit is set, the process 1100 continues at operation 1140. In response to a determination the valid bit is not set, the process 1100 continues at operation 1150.

At operation 1140, the L2 controller writes the cmain_address, cmain_secure, and the cmain_MESI to the shadow victim cache (e.g., L2 shadow victim cache tags 620).

At operation 1150, the L2 controller determines whether the valid bit (cvictim_valid) for the indicated cache line in the L2 shadow victim cache is set. In response to a determination the valid bit is set, the process 1100 continues at operation 1160. In response to a determination the valid bit is not set, the process 1100 continues at operation 1190 (e.g., where the process 1100 terminates).

At operation 1160, the L2 controller evaluates the MESI field (cvictim_mesi) for the indicated cache line of the victim cache to determine whether the for the indicated cache line is invalid, shared or exclusive, or modified. In response to a determination that the indicated cache line is invalid, the process 1100 continues at operation 1190. In response to a determination that the indicated cache line is shared or exclusive, the process 1100 continues at operation 1170. In response to a determination that the indicated cache line is modified, the process 1100 continues at operation 1170.

At operation 1170 (for the determined shared or exclusive state), the L2 controller removes the cache line entry from the shadow victim cache that has stored caddress and csecure values that match the caddress and csecure values of the received allocating read signal. Upon removal of the matching cache line entry, the process 1100 continues at operation 1190 (e.g., where the process 1100 can be terminated).

At operation 1180 (for the determined modified state), the L2 controller retains the cache line entry in the shadow victim cache that has stored caddress and csecure values that match the caddress and csecure values of the received allocating read signal. The matching cache line entry is retained in the shadow victim cache at least until a subsequent victim cache transaction is received from the lower level (e.g., L1D) cache. The process 1100 continues at operation 1190 (e.g., where the process 1100 can be terminated).

At operation 1190, the process 1100 is considered "done," and the L2 controller can continue processing subsequent cache requests.

FIG. 12 is a flow diagram of an example process for a victim write operation in a multi-level caching system. The process 1200 is an example process such as a victim write operation that can be initiated in response to a victim write operation received from a lower level controller (e.g., the L1D). The process 1200 is initiated at operation 1210.

At operation 1210, a victim write operation request is sent to an L2 controller (e.g., UMC 430) by a lower level data memory controller (e.g., DMC 361).

At operation 1220, the L2 controller determines whether the stored caddress and csecure values of a cache line entry in the shadow victim cache match the caddress and csecure values of the received allocating read signal. In response to a determination of a match (yes), the process 1100 continues at operation 1230. In response to a determination of no match (no), the process 1100 continues at operation 1140.

At operation 1230, the L2 controller updates the shadow victim cache to invalidate the cache line indicated by the received victim write operation as needed to maintain coherency and/or security. For example, when the L1 controller sends a victim to L2, the L1 controller is removing a modified line from its cache (e.g., L1 main or victim cache). As the modified line is being removed from the L1 cache, the L1 controller updates the L1 tags to indicate that the modified line has been removed as an entry from the L1 TAG RAM. Because the shadow TAGRAM (for shadowing both the L1 main and victim caches) inside the L2 controller tracks the L1 TAG RAM, the entry is also removed from the L2 Shadow TAGRAM (main and victim) to mirror the removal from the L1 TAG RAM. Latency by the L2 controller for future transactions (such as MMU reads) is reduced because of the L2 controller can generate snoops (or not generate snoops) for this line based on the shadow tags locally held in the L2 controller.

At operation 1240, the endpoint memory is updated with the victim data (e.g., victim data from a victim cache line that matched the caddress and csecure values of the received victim write operation).

Modifications are possible in the described embodiments, and other embodiments are possible, within the scope of the claims.

What is claimed is:

1. A system, comprising:
   a central processing unit (CPU) arranged to execute program instructions to manipulate data in at least a first or second secure context, wherein the first and second secure contexts indicate different levels of security;
   a first level cache coupled to the CPU to temporarily store data in cache lines for manipulation by the CPU, wherein the first level cache includes a first secure code memory for storing a first-level-cache secure code list of secure codes, wherein each secure code indicates one of the at least first or second secure contexts by which data for a respective cache line is received, and wherein the first level cache includes a first level cache controller; and
   a second level cache coupled to the first level cache to temporarily store data in cache lines for manipulation by the CPU, wherein the second level cache includes a second secure code memory for storing a second-level-cache secure code list of secure codes, wherein each secure code indicates one of the at least first or second secure contexts by which data for a respective cache line is received, and wherein the second level cache includes a second level cache controller;
   wherein the first level cache controller is configured to send an access request to the second level cache controller, the access request including an address of a selected cache line of data and a secure code indicating the one of the at least first or second secure contexts by which data for the selected cache line was received; and
   wherein the second level cache controller is configured to compare the address and the secure code of the access request against a secure code stored in the second level cache for a cache line of data indicated by the address of the access request, and in response to the comparison, execute a cache coherency operation.

2. The system of claim 1, wherein the second level cache includes a shadow copy of the first-level-cache secure code list of secure codes.

3. The system of claim 2, wherein the first level cache includes a first level local memory addressable by the CPU.

4. The system of claim 3, wherein the second level cache includes a second level local memory addressable by the CPU.

5. The system of claim 4, comprising a requestor coupled to the second level cache and arranged to send a coherence read transaction to the second level cache controller, wherein the coherence read transaction includes an address of a cache line of data addressable by the CPU and the secure code that indicates the one of the at least first or second secure contexts by which data for the cache line addressed by the coherence read transaction was received, wherein the second level cache controller compares the address and the secure code of the coherence read transaction against a secure code stored in the second level cache for a cache line of data indicated by the address of the coherence read transaction, and in response to the comparison being affirmative, the second level cache controller generating a snoop read transaction and sending the snoop read transaction to the first level cache.

6. The system of claim 5, wherein the requestor is one of a memory management unit (MMU), a streaming engine (SE), and a direct memory access (DMA) controller.

7. The system of claim 4, comprising a third level cache coupled to the second level cache and arranged to send a snoop transaction to the second level cache controller, wherein the snoop transaction includes an address of a cache line of data addressable by the CPU and the secure code that indicates the one of the at least first or second secure contexts by which data for the cache line addressed by the snoop transaction was received, wherein the second level cache controller compares the address and the secure code of the snoop transaction against a secure code stored in the second level cache for a cache line of data indicated by the address of the snoop transaction, and in response to the comparison being affirmative, the second level cache controller generating a snoop read transaction and sending the snoop read transaction to the first level cache.

8. The system of claim 4, wherein the CPU is arranged to send a cache maintenance operation (CMO) transaction to the second level cache controller, wherein the CMO transaction includes an address of a cache line of data addressable by the CPU and the secure code that indicates the one of the at least first or second secure contexts by which data for the cache line addressed by the CMO transaction was received, wherein the second level cache controller compares the address and the secure code of the CMO transaction against a secure code stored in the second level cache for a cache line of data indicated by the address of the CMO transaction, and in response to the comparison being affirmative, the second level cache controller generating a snoop read transaction and sending the snoop read transaction to the first level cache.

9. The system of claim 4, comprising a data memory controller (DMC) coupled to the second level cache and arranged to send a victim write transaction to the second level cache controller, wherein the victim write transaction includes a victim data, an address of a cache line of data addressable by the CPU, and the secure code that indicates the one of the at least first or second secure contexts by which data for the cache line addressed by the victim write transaction was received, wherein the second level cache controller compares the address and the secure code of the victim write transaction against a secure code stored in the second level cache for a cache line of data indicated by the address of the victim write transaction, and in response to the comparison being affirmative, the second level cache controller updating a shadow victim cache with the victim data.

10. The system of claim 4, comprising a DMA controller coupled to the second level cache and arranged to send a coherence DMA write transaction to the second level cache controller, wherein the coherence DMA write transaction includes an address of a cache line of data addressable by the CPU and the secure code that indicates the one of the at least first or second secure contexts by which data for the cache line addressed by the coherence DMA write transaction was received, wherein the second level cache controller compares the address and the secure code of the coherence DMA write transaction against a secure code stored in the second level cache for a cache line of data indicated by the address of the coherence DMA write transaction, and in response to the comparison being affirmative, the second level cache controller generating a snoop read transaction and sending the snoop read transaction to the first level cache.

11. The system of claim 1, wherein the secure code is a bit for indicating one of the first and second secure contexts.

12. A method, comprising:
executing program instructions to manipulate data by a CPU in at least a first or second secure context, wherein the first and second secure contexts indicate different levels of security;
temporarily storing data in cache lines of a first level cache for manipulation by the CPU, wherein the first level cache includes a first secure code memory and a first level cache controller;
storing a secure code in a first-level-cache secure code list, wherein each secure code indicates one of the at least first or second secure contexts by which data for a respective cache line is received by the first level cache;
temporarily storing data in cache lines of a second level cache for manipulation by the CPU, wherein the second level cache includes a second secure code memory and a second level cache controller;
storing a secure code in a second-level-cache secure code list, wherein each secure code indicates one of the at least first or second secure contexts by which data for a respective cache line is received by the second level cache;
sending, by the first level cache controller, an access request to the second level cache controller, the access request including an address of a selected cache line of data and a secure code indicating the one of the at least first or second secure contexts by which data for the selected cache line was received;
comparing, by the second level cache controller, the address and the secure code of the access request against a secure code stored in the second level cache for a cache line of data indicated by the address of the access request; and
executing a cache coherency operation in response to the comparison.

13. The method of claim 12, further comprising snooping the first level cache to maintain in the second level cache a shadow copy of the first-level-cache secure code list.

14. The method of claim 13, wherein the first level cache includes a first level local memory addressable by the CPU.

15. The method of claim 14, wherein the second level cache includes a second level local memory addressable by the CPU.

16. The method of claim 15, further comprising:
sending a coherence read transaction to the second level cache, wherein the coherence read transaction includes an address of a cache line of data addressable by the CPU and the secure code that indicates the one of the at least first or second secure contexts by which data for the cache line addressed by the coherence read transaction was received;

comparing the address and the secure code of the coherence read transaction against a secure code stored in the second level cache for a cache line of data indicated by the address of the coherence read transaction; and in response to the comparison being affirmative, sending a snoop read transaction from the second level cache to the first level cache.

17. A system, comprising:
a cache that includes:
- a local memory that includes a set of cache lines to store a set of data; and
- a secure code memory to store a secure code list of secure codes, wherein each of the secure codes indicates a respective secure context of a subset of the set of data stored in a respective cache line of the set of cache lines,
- wherein a first secure code of the secure codes is associated with a first subset of the set of data stored in a first cache line of the set of cache lines, the first secure code indicating a security context of a process that generated the information stored in the first cache line, and
- wherein the system selectively allows: the first cache line to be read from the cache but not removed from the cache, the first cache line to be read and removed from the cache, or the first cache line to be removed from the cache in response to a comparison of a security context of an access request directed to the first cache line to the security context indicated by the first secure code.

18. The system of claim 17, comprising a CPU configured to control access to the first cache line by a requestor.

19. The system of claim 18, wherein the cache is a first level cache.

20. The system of claim 18, wherein the cache is a second level cache.

* * * * *